(12) United States Patent
Sugawara

(10) Patent No.: US 11,853,631 B2
(45) Date of Patent: Dec. 26, 2023

(54) COMMUNICATION APPARATUS, CONTROL METHOD FOR CONTROLLING THE SAME, AND STORAGE MEDIUM

(71) Applicant: CANON KABUSHIKI KAISHA, Tokyo (JP)

(72) Inventor: Wahei Sugawara, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/823,477

(22) Filed: Aug. 30, 2022

(65) Prior Publication Data
US 2023/0061893 A1  Mar. 2, 2023

(30) Foreign Application Priority Data

Aug. 31, 2021 (JP) ................................. 2021-141379
Jun. 23, 2022 (JP) ................................. 2022-101446

(51) Int. Cl.
| | |
|---|---|
| *G06F 3/12* | (2006.01) |
| *H04W 48/16* | (2009.01) |
| *H04W 76/18* | (2018.01) |
| *H04W 76/15* | (2018.01) |
| *H04W 48/06* | (2009.01) |

(52) U.S. Cl.
CPC .......... *G06F 3/1292* (2013.01); *G06F 3/1203* (2013.01); *G06F 3/1236* (2013.01); *H04W 48/06* (2013.01); *H04W 76/15* (2018.02); *H04W 76/18* (2018.02)

(58) Field of Classification Search
CPC .... G06F 3/1292; G06F 3/1203; G06F 3/1236; H04W 76/15; H04W 76/18; H04W 48/16
USPC ......................................................... 358/1.15
See application file for complete search history.

(56) References Cited

U.S. PATENT DOCUMENTS

| | | | | |
|---|---|---|---|---|
| 2016/0150412 | A1* | 5/2016 | Liu ........................ | G06F 16/334 370/338 |
| 2017/0295448 | A1* | 10/2017 | McCann ................ | H04W 12/04 |
| 2018/0077255 | A1* | 3/2018 | Goto ...................... | H04W 12/06 |

FOREIGN PATENT DOCUMENTS

JP     2016127545 A     7/2016

* cited by examiner

*Primary Examiner* — Allen H Nguyen
(74) *Attorney, Agent, or Firm* — Canon U.S.A., Inc. IP Division

(57) ABSTRACT

A communication apparatus that communicates with an information processing apparatus includes a first control unit configured to execute first control to acquire connection information for the communication apparatus to connect to an access point from the information processing apparatus via communication with the information processing apparatus using a first protocol, and a third control unit configured to execute third control to, in a case where the connection between the communication apparatus and the access point is not established using the connection information acquired by the first control unit, continue the second state where the communication apparatus can communicate with the information processing apparatus using the second protocol, without disabling the second state.

19 Claims, 11 Drawing Sheets

FIG.1

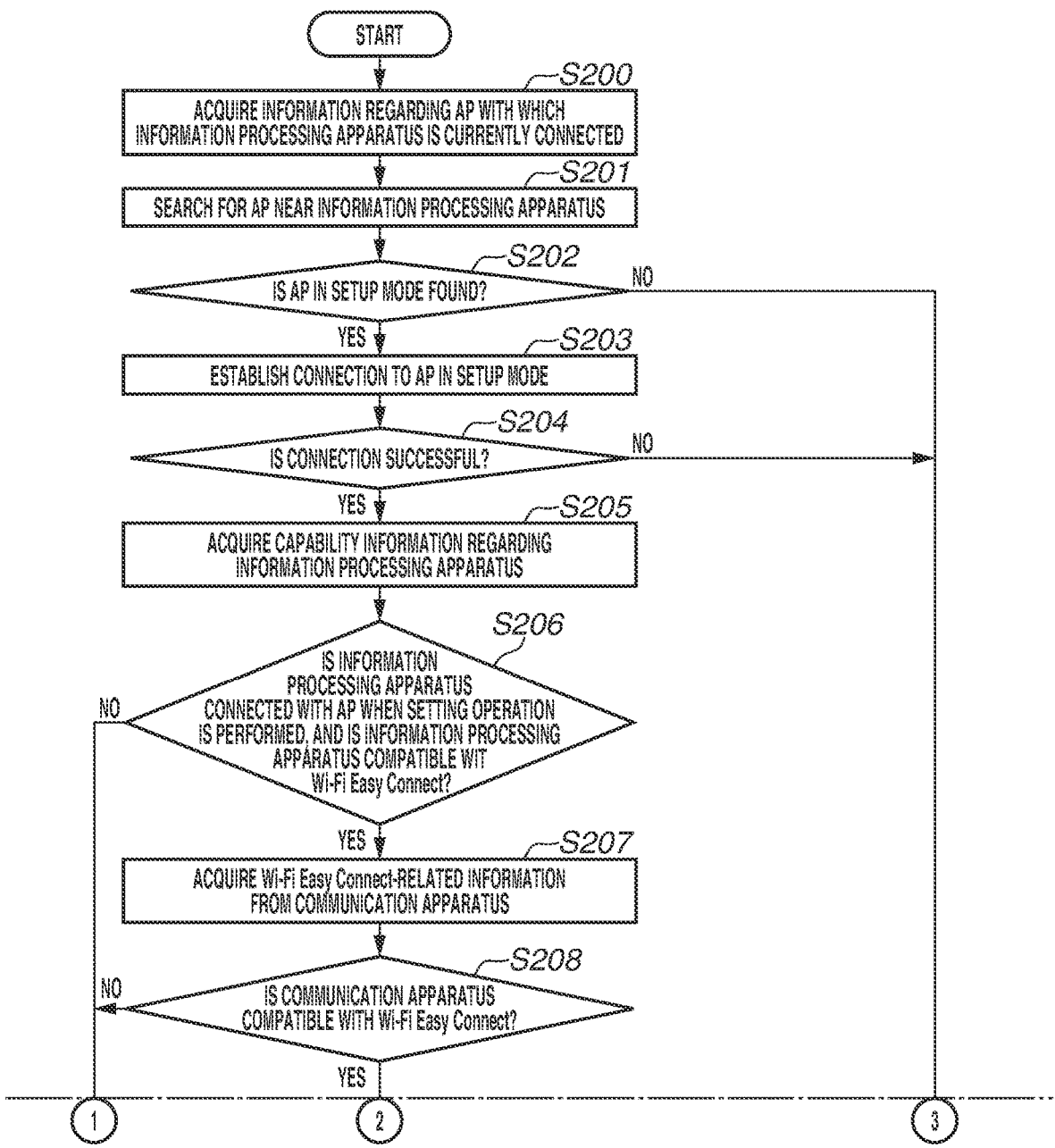

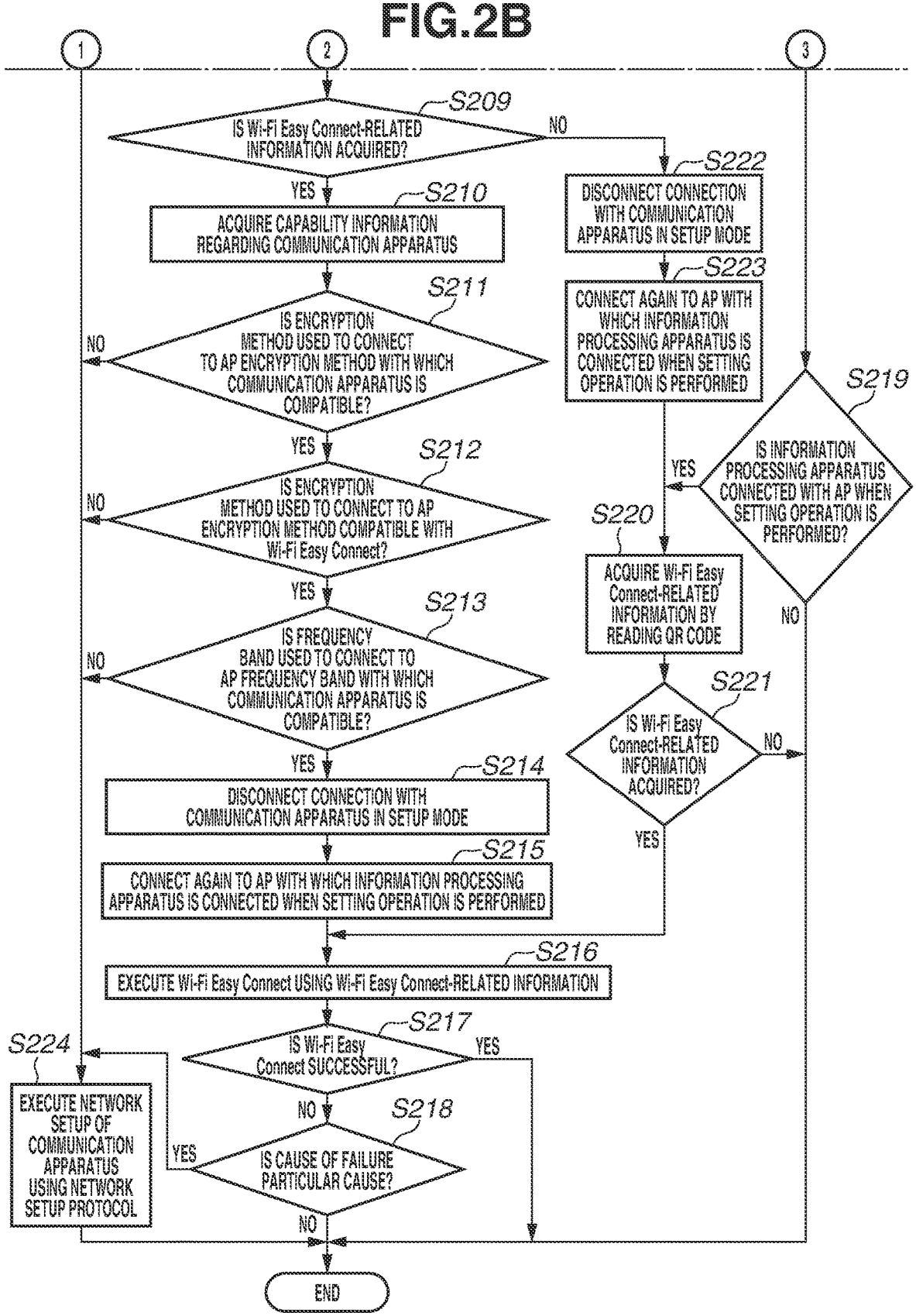

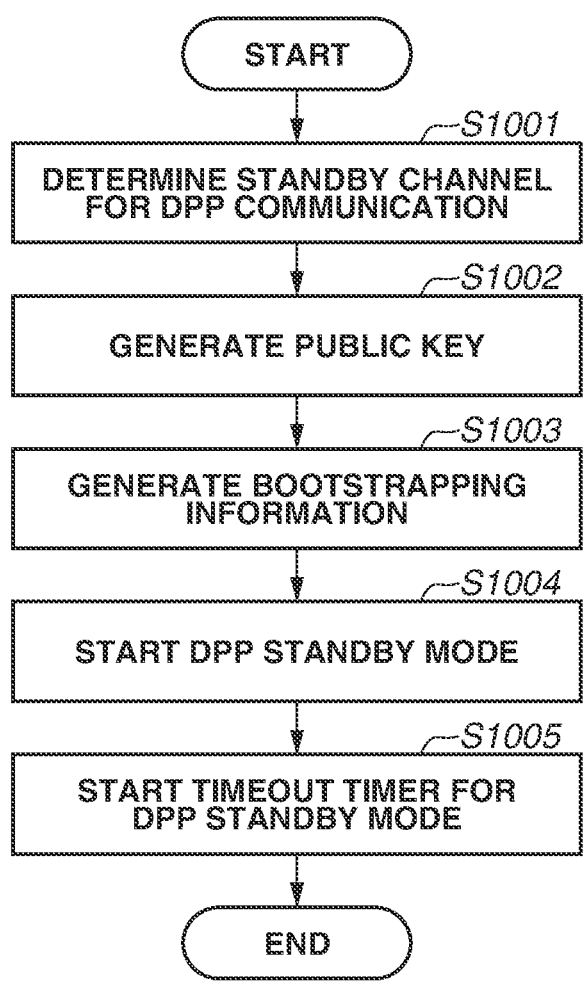

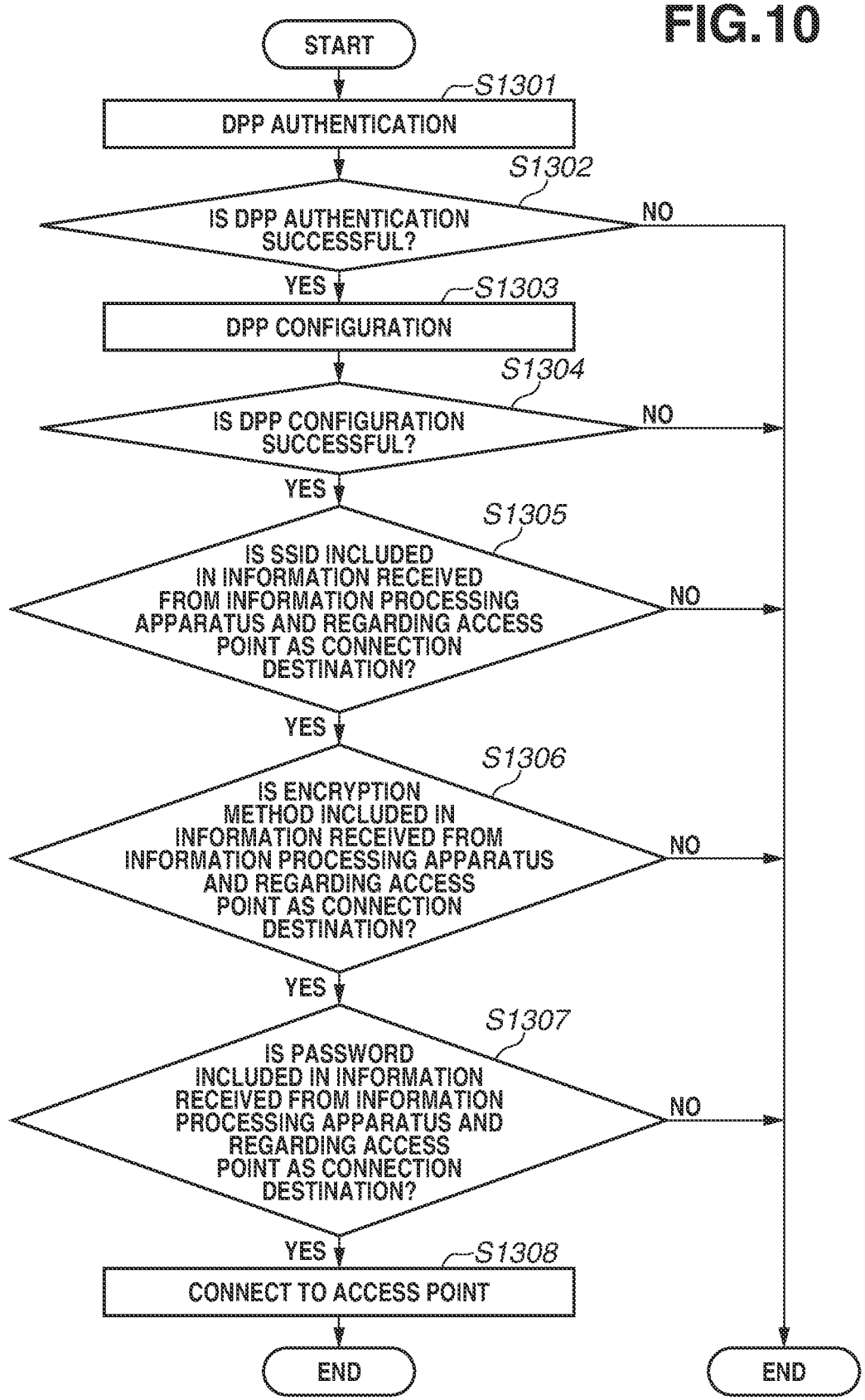

COMMUNICATION APPARATUS, CONTROL METHOD FOR CONTROLLING THE SAME, AND STORAGE MEDIUM

BACKGROUND OF THE INVENTION

Field of the Invention

The present invention relates to a communication apparatus, a control method for controlling the same, and a storage medium.

Description of the Related Art

A technique is known in which an information processing apparatus such as a personal computer (PC) transmits information regarding an access point to a communication apparatus such as a printer and connects the communication apparatus and the access point (the publication of Japanese Patent Application Laid-Open No. 2016-127545).

While the function of transmitting connection information for connecting to an access point to a communication apparatus and connecting the communication apparatus and the access point is prevalent, an improvement in the convenience of this function is required.

SUMMARY OF THE INVENTION

The present invention is directed to improving the convenience of the function of connecting a communication apparatus and an access point.

According to an aspect of the present disclosure, a communication apparatus that communicates with an information processing apparatus includes a first control unit configured to execute first control to acquire connection information for the communication apparatus to connect to an access point from the information processing apparatus via communication with the information processing apparatus using a first protocol, a second control unit configured to execute second control to, in a case where a connection between the communication apparatus and the access point is established using the connection information acquired by the first control unit, disable a second state where the communication apparatus can communicate with the information processing apparatus using a second protocol different from the first protocol, and a third control unit configured to execute third control to, in a case where the connection between the communication apparatus and the access point is not established using the connection information acquired by the first control unit, continue the second state where the communication apparatus can communicate with the information processing apparatus using the second protocol, without disabling the second state.

Further features of the present invention will become apparent from the following description of exemplary embodiments with reference to the attached drawings.

BRIEF DESCRIPTION OF THE DRAWINGS

FIG. 1 is a diagram illustrating configurations of an information processing apparatus, a communication apparatus, and an access point.

FIGS. 2A and 2A are a flowchart illustrating a flow of processing executed by the information processing apparatus in a network setup process.

FIG. 9 is a flowchart illustrating a Device Provisioning Protocol (DPP) standby mode start process.

FIG. 10 is a flowchart illustrating a process of executing Wi-Fi Easy Connect.

DESCRIPTION OF THE EMBODIMENTS

Figure 3:
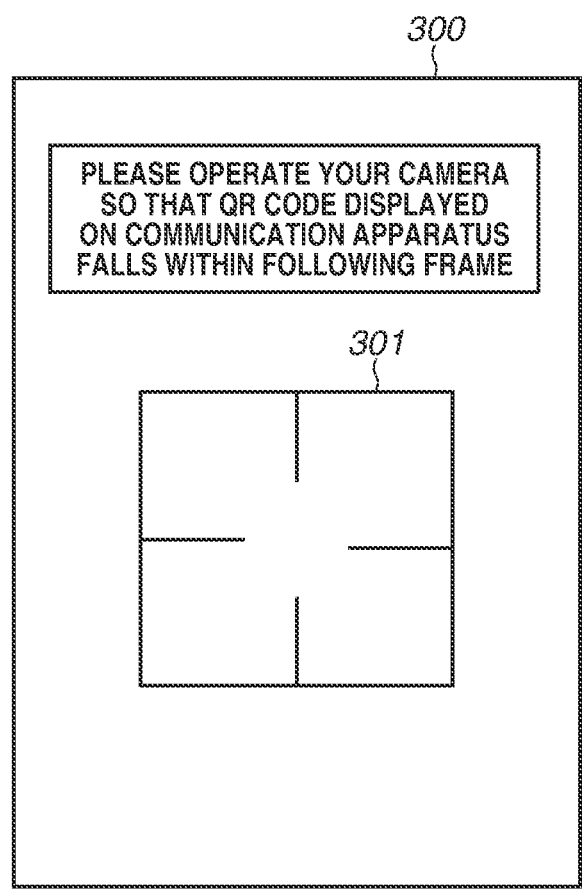
FIG. 3 is an example of a Quick Response (QR) code (registered trademark) capturing screen displayed by a setting application.

Suitable exemplary embodiments of the present invention will be illustratively described below with reference to the drawings. Regarding the present invention, however, it should be understood that appropriate changes and improvements in the following exemplary embodiments based on the normal knowledge of a person skilled in the art without departing from the spirit of the present invention are also included in the scope of the present invention.

A description will be given of an information processing apparatus and a communication apparatus included in a communication system according to a first exemplary embodiment. In the present exemplary embodiment, a smartphone is illustrated as an example of the information processing apparatus. The present exemplary embodiment, however, is not limited to this. For example, the information processing apparatus can be various apparatuses such as a mobile terminal, a personal computer (PC), a tablet terminal, a personal digital assistant (PDA), and a digital camera. In the present exemplary embodiment, a printer is illustrated as an example of the communication apparatus. The present exemplary embodiment, however, is not limited to this. Alternatively, the communication apparatus can be various apparatuses so long as the apparatuses can wirelessly communicate with the information processing apparatus. For example, in the case of a printer, the communication apparatus can be an inkjet printer, a full-color laser beam printer, and a monochrome printer. The communication apparatus is applicable not only to a printer, but also to a copying machine, a facsimile apparatus, a mobile terminal, a smartphone, a laptop PC, a tablet terminal, a PDA, a digital camera, a music reproduction device, a television, and a smart speaker. Additionally, the communication apparatus can also be a multifunction peripheral having a plurality of functions such as a copy function, a fax function, and a print function.

In the present exemplary embodiment, in a case where the information processing apparatus supports a function termed "Wi-Fi Easy Connect" (registered trademark), the information processing apparatus can execute this function. Wi-Fi Easy Connect is the function of executing network setup of another apparatus using Device Provisioning Protocol (hereinafter, "DPP") formulated by the Wi-Fi Alliance. Specifically, the "network setup of another apparatus" refers to the process of connecting another apparatus to an access point forming a network. In Wi-Fi Easy Connect, an apparatus that operates as a role termed "configurator" (hereinafter, a "configurator apparatus") and an apparatus that operates as a role termed "enrollee" (hereinafter, an "enrollee apparatus") communicate with each other. The configurator apparatus acquires bootstrapping information from the enrollee apparatus. The bootstrapping information includes, for example, identification information (the media access control (MAC) address) regarding the enrollee apparatus and public key information used to securely communicate with the enrollee apparatus. In the present exemplary embodiment, the bootstrapping information is described as "Wi-Fi Easy Connect-related information". Other information may also be treated as the Wi-Fi Easy Connect-related information. Then, the configurator apparatus wirelessly communicates with the enrollee apparatus using the acquired bootstrapping information. Specifically, for example, the configurator apparatus communicates with the enrollee apparatus using the public key included in the bootstrapping information. Further, based on information obtained in the communication, the configurator apparatus generates a common key and transmits information encrypted using the generated common key to the enrollee apparatus. Specifically, the information transmitted at this time is, for example, connection information for connecting to an access point. Then, the enrollee apparatus establishes a wireless connection to the access point using the connection information received from the configurator apparatus. A description will be given on the assumption that in a network setup process using Wi-Fi Easy Connect according to the present exemplary embodiment, an information processing apparatus compatible with Wi-Fi Easy Connect operates as a configurator apparatus and a communication apparatus compatible with Wi-Fi Easy Connect operates as an enrollee apparatus.

Figure 1:
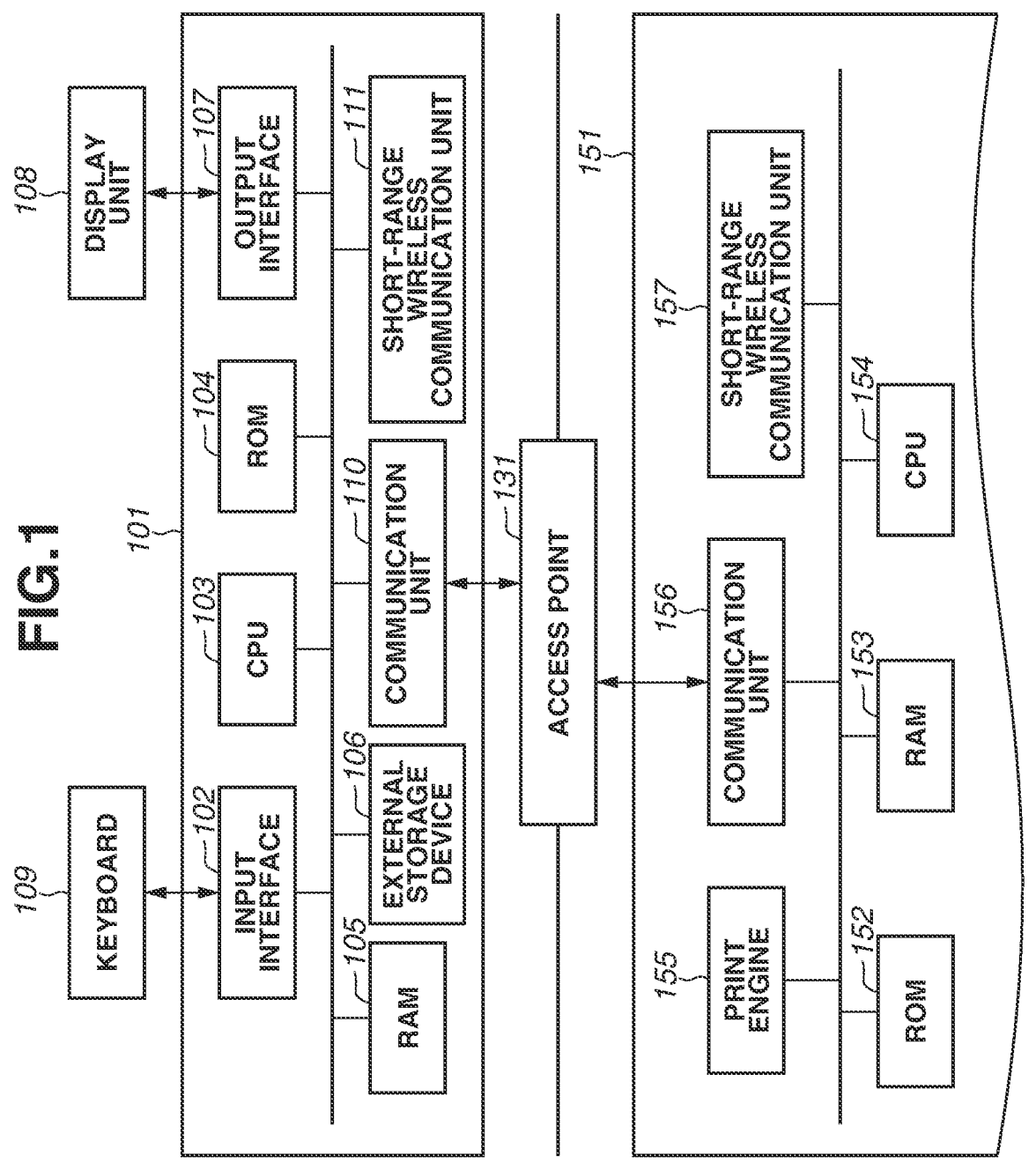

First, a description will be given of the configurations of the information processing apparatus according to the present exemplary embodiment and the communication apparatus capable of communicating with the information processing apparatus according to the present exemplary embodiment with reference to a block diagram in FIG. 1. Although the present exemplary embodiment will be described taking the following configurations as examples, the present exemplary embodiment is applicable to an apparatus capable of communicating with a communication apparatus, and functions are not particularly limited as illustrated in FIG. 1.

An information processing apparatus 101 is the information processing apparatus according to the present exemplary embodiment. The information processing apparatus 101 includes an input interface 102, a central processing unit (CPU) 103, a read-only memory (ROM) 104, a random access memory (RAM) 105, an external storage device 106, an output interface 107, a display unit 108, a communication unit 110, and a short-range wireless communication unit 111. The CPU 103, the ROM 104, and the RAM 105 form a computer of the information processing apparatus 101.

The input interface 102 is an interface for receiving an input of data or an operation instruction from a user by the user operating an operation unit such as a keyboard 109. The operation unit may be a physical keyboard or a physical button, or may be a software keyboard or a software button displayed on the display unit 108. That is, the input interface 102 may receive an input from the user through the display unit 108.

The CPU 103 is a system control unit and controls the entirety of the information processing apparatus 101.

The ROM 104 stores fixed data such as control programs to be executed by the CPU 103, a data table, and an embedded operating system (hereinafter referred to as "OS") program. In the present exemplary embodiment, the control programs stored in the ROM 104 control the execution of software such as scheduling, a task switch, and an interrupt processing under control of the embedded OS stored in the ROM 104.

The RAM 105 is composed of a static random-access memory (SRAM), which requires a backup power supply. In the RAM 105, data is held by a primary battery for data backup (not illustrated). Thus, the RAM 105 can store important data such as a program control variable without volatilizing the data. A memory area for storing setting information regarding the information processing apparatus 101 and management data on the information processing apparatus 101 is also provided in the RAM 105. The RAM 105 is used also as a main memory and a work memory for the CPU 103.

The external storage device 106 saves an application program for executing network setup of a communication apparatus 151 (hereinafter, a "setting application"), and a print information generation program for generating print information that can be interpreted by the communication apparatus 151. The setting application is an application program for setting an access point as a connection destination of the communication apparatus 151 using Wi-Fi Easy Connect. Alternatively, the setting application may have another function other than the network setup function. For example, the setting application may have the function of causing the communication apparatus 151 to execute printing, the function of causing the communication apparatus 151 to scan a set document, or the function of confirming the state of the communication apparatus 151. For example, the setting application is installed from an external server through the Internet communication via the communication unit 110, thereby being stored in the external storage device 106. The external storage device 106 also saves various programs such as an information transmission/reception control program for transmitting and receiving information to and from the communication apparatus 151 connected to the information processing apparatus 101 via the communication unit 110, and various pieces of information to be used in these programs.

The output interface 107 is an interface for controlling the display unit 108 to display data or give a notification of the state of the information processing apparatus 101.

The display unit 108 is composed of a light-emitting diode (LED) or a liquid crystal display (LCD). The display unit 108 displays data or gives a notification of the state of the information processing apparatus 101.

The communication unit 110 is a component for connecting to an apparatus such as the communication apparatus 151 or an access point 131 and communicating data. For example, the communication unit 110 can connect to an access point (not illustrated) in the communication apparatus 151. The communication unit 110 and the access point in the communication apparatus 151 connect to each other, whereby the information processing apparatus 101 and the communication apparatus 151 can communicate with each other. The communication unit 110 may directly communicate with the communication apparatus 151 through wireless communication, or may communicate with the communication apparatus 151 via an external apparatus present outside the information processing apparatus 101 and the communication apparatus 151. Examples of the external apparatus include an external access point (the access point 131)

present outside the information processing apparatus 101 and outside the communication apparatus 151, and an apparatus other than an access point and capable of relaying communication. In the present exemplary embodiment, the wireless communication method used by the communication unit 110 is Wireless Fidelity (Wi-Fi) (registered trademark), which is a communication standard compliant with the Institute of Electrical and Electronics Engineers (IEEE) 802.11 series. Wi-Fi Easy Connect is executed through communication by the communication unit 110. Examples of the access point 131 include a device such as a wireless local area network (LAN) router. In the present exemplary embodiment, a method in which the information processing apparatus 101 and the communication apparatus 151 are directly connect to each other not via the external access point is referred to as a "direct connection method", and direct communication is communication via a direct connection. A method in which the information processing apparatus 101 and the communication apparatus 151 connect to each other via the external access point is referred to as an "infrastructure connection method", and infrastructure communication is communication via an infrastructure connection. The short-range wireless communication unit 111 is a component for wirelessly connecting to an apparatus such as the communication apparatus 151 over a short range and communicating data. The short-range wireless communication unit 111 communicates using a communication method different from that of the communication unit 110. For example, the short-range wireless communication unit 111 can connect to a short-range wireless communication unit 157 in the communication apparatus 151. Examples of the communication method include near-field communication (NFC), Bluetooth (registered trademark) Classic, Bluetooth Low Energy, and Wi-Fi Aware.

In the present exemplary embodiment, based on an instruction to execute a network setup process from the setting application, the information processing apparatus 101 uses the OS of the information processing apparatus 101 to execute Wi-Fi Easy Connect.

The communication apparatus 151 is the communication apparatus according to the present exemplary embodiment. The communication apparatus 151 includes a ROM 152, a RAM 153, a CPU 154, a print engine 155, a communication unit 156, and a short-range wireless communication unit 157. The ROM 152, the RAM 153, and the CPU 154 form a computer of the communication apparatus 151.

The communication unit 156 includes, as the access point in the communication apparatus 151, an access point for connecting to an apparatus such as the information processing apparatus 101. The access point can connect to the communication unit 110 of the information processing apparatus 101. The communication unit 156 enables the access point, whereby the communication apparatus 151 operates as an access point. The communication unit 156 may directly wirelessly connect to the information processing apparatus 101, or may wirelessly connect to the information processing apparatus 101 via the access point 131. In the present exemplary embodiment, the wireless communication method used by the communication unit 156 is a communication standard compliant with the IEEE 802.11 series. In the following description, Wi-Fi (registered trademark) is a communication standard compliant with the IEEE 802.11 series. If the communication apparatus 151 is compatible with Wi-Fi Easy Connect, Wi-Fi Easy Connect is executed through communication by the communication unit 156. The communication unit 156 may include hardware functioning as an access point, or may operate as an access point by software for causing the communication unit 156 to function as an access point.

The communication apparatus 151 according to the present exemplary embodiment can operate in an infrastructure mode and a peer-to-peer (P2P) mode as modes for communicating using the communication unit 156.

The "infrastructure mode" refers to a form in which the communication apparatus 151 communicates with another apparatus such as the information processing apparatus 101 via an external apparatus (e.g., the access point 131) forming a network. A connection to the external access point established by the communication apparatus 151 operating in the infrastructure mode is referred to as an "infrastructure connection". In the present exemplary embodiment, in the infrastructure connection, the communication apparatus 151 operates as a slave station and the external access point operates as a master station. In the present exemplary embodiment, a "master station" refers to an apparatus that determines a communication channel used in a network to which the master station belongs, and a "slave station" refers to an apparatus that does not determine a communication channel used in a network to which the slave station belongs and uses the communication channel determined by the master station.

The "P2P mode" refers to a form in which the communication apparatus 151 directly communicates with another apparatus such as the information processing apparatus 101 not via an external apparatus forming a network. In the present exemplary embodiment, the P2P mode includes an AP mode where the communication apparatus 151 operates as an access point. Connection information (the service set identifier (SSID) and the password) regarding the access point enabled in the communication apparatus 151 in the AP mode can be optionally set by the user. The P2P mode may include, for example, a Wi-Fi Direct mode for the communication apparatus 151 to communicate using Wi-Fi Direct. For example, which of a plurality of Wi-Fi Direct-compatible devices is to operate as a master station is determined according to a sequence termed "group owner negotiation". Alternatively, the master station may be determined without executing the group owner negotiation. Particularly, an apparatus that is a Wi-Fi Direct-compatible device and functions as the master station is referred to as a "group owner". A direct connection to another apparatus established by the communication apparatus 151 operating in the P2P mode is referred to as a "direct connection". In the present exemplary embodiment, in the direct connection, the communication apparatus 151 operates as a master station and another apparatus operates as a slave station.

In the present exemplary embodiment, the communication apparatus 151 receives a predetermined operation from the user and thereby can operate in a network setup mode, which is a mode for executing network setup of the communication apparatus 151. In a case where the communication apparatus 151 operates in the network setup mode, the communication apparatus 151 operates as a setup access point that is enabled while the communication apparatus 151 is operating in the network setup mode, using the communication unit 156. The setup access point is an access point different from the access point enabled in the AP mode. The SSID of the setup access point includes a predetermined character string that can be recognized by the setting application of the information processing apparatus 101.

The setup access point is an access point that does not require a password to connect to the access point. The communication apparatus 151 operating in the network setup mode uses a predetermined communication protocol (a setup communication protocol) in communication with the information processing apparatus 101 connected to the setup access point. Specifically, the setup communication protocol is, for example, Simple Network Management Protocol (SNMP). If a predetermined time elapses after an operation in the network setup mode is started, the communication apparatus 151 stops the operation in the network setup mode and disables the setup access point. This is because, as described above, the setup access point is an access point that does not require a password, and therefore, if the setup access point is enabled for a long time, this increases the possibility that an inappropriate apparatus requests a connection to the setup access point. Alternatively, the setup access point may be an access point that requires a password. In this case, the password used to connect to the setup access point is a fixed password (that cannot be changed by the user) identified in advance by the setting application.

Further, in the present exemplary embodiment, the communication apparatus 151 receives a predetermined operation from the user and thereby can operate also in a mode for executing network setup of the communication apparatus 151 using a communication protocol different from the setup communication protocol. In the present exemplary embodiment, the communication protocol different from the setup communication protocol is DPP, and this mode is referred to as a "DPP standby mode". If the communication apparatus 151 receives a request for network setup using DPP from the information processing apparatus 101 in the state where the communication apparatus 151 is operating in the DPP standby mode, the communication apparatus 151 executes network setup using DPP as described below. Thus, in other words, the DPP standby mode is a mode where the communication apparatus 151 waits for a request for network setup using DPP. The DPP standby mode will be described below with reference to FIG. 9.

In the present exemplary embodiment, the network setup mode and the DPP standby mode can operate simultaneously (in parallel). The state where the network setup mode and the DPP standby mode operate simultaneously (in parallel) is referred to as a "simultaneous operation". Then, in the present exemplary embodiment, network interfaces used in communication in the network setup mode and communication in the DPP standby mode are different interfaces. The interface used in communication in the network setup mode is an interface for direct communication, and the interface used in communication in the DPP standby mode is an interface for infrastructure communication.

A wireless chip for Wi-Fi communication mounted on the communication apparatus 151 according to the present exemplary embodiment is a single wireless chip, and the operations of the interface for direct communication and the interface for infrastructure communication are achieved by the single wireless chip. That is, the wireless chip for Wi-Fi communication switches in a time division manner the state where the wireless chip communicates in the network setup mode and the state where the wireless chip communicates in the DPP standby mode. If an interface to be used switches, a channel used in communication of the interface to be used also switches. The present invention is not limited to this, and a plurality of wireless chips may be mounted on the communication apparatus 151. In this case, the operations of the interface for direct communication and the interface for infrastructure communication may be achieved by different wireless chips (e.g., a first wireless chip and a second wireless chip). Further, in this case, the state where the first wireless chip communicates in the network setup mode and the state where the second wireless chip communicates in the DPP standby mode may operate in parallel.

The short-range wireless communication unit 157 is a component for wirelessly connecting to an apparatus such as the information processing apparatus 101 over a short range, and for example, can connect to the short-range wireless communication unit 111 in the information processing apparatus 101. Examples of the communication method include NFC, Bluetooth Classic, Bluetooth Low Energy, and Wi-Fi Aware.

The RAM 153 is composed of a dynamic random-access memory (DRAM), which requires a backup power supply. In the RAM 153, data is held by a primary battery for data backup (not illustrated). Thus, the RAM 153 can store important data such as a program control variable without volatilizing the data. A memory area for storing setting information regarding the communication apparatus 151 and management data on the communication apparatus 151 is also provided in the RAM 153. The RAM 153 is used also as a main memory and a work memory for the CPU 154. The RAM 153 saves a reception buffer for temporarily saving print information received from the information processing apparatus 101 and also saves various pieces of information.

The ROM 152 stores fixed data such as control programs to be executed by the CPU 154, a data table, and an OS program. In the present exemplary embodiment, the control programs stored in the ROM 152 control the execution of software such as scheduling, a task switch, and an interrupt processing under control of the embedded OS stored in the ROM 152.

The CPU 154 is a system control unit and controls the entirety of the communication apparatus 151.

Based on information saved in the RAM 153 or print information received from the information processing apparatus 101, the print engine 155 applies a recording agent such as ink to a recording medium such as paper, thereby forming an image on the recording medium. Then, the print engine 155 outputs the printing result. Generally, the amount of data of a print job transmitted from the information processing apparatus 101 is large, and therefore, it is necessary to use a communication method capable of high-speed communication to communicate the print job. Thus, the communication apparatus 151 receives the print job via the communication unit 156, which can communicate faster than the short-range wireless communication unit 157.

To the communication apparatus 151, a memory such as an external hard disk drive (HDD) or a Secure Digital (SD) card may be attached as an option device. Information saved in the communication apparatus 151 may also be saved in this memory.

FIG. 2 is a flowchart illustrating the flow of processing executed by the information processing apparatus 101 in a network setup process according to the present exemplary embodiment. The flowchart illustrated in FIG. 2 is achieved, for example, by the CPU 103 loading the setting application stored in the ROM 104 or the external storage device 106 into the RAM 105 and executing the setting application. The flowchart illustrated in FIG. 2 is started according to the execution of a predetermined operation for network setup (hereinafter, a "setting operation") on a screen displayed by the setting application.

First, in step S200, the CPU 103 acquires information regarding an access point with which the information processing apparatus 101 is wirelessly connected using Wi-Fi at least when the setting operation is performed (hereinafter, a "connected AP"). In the present exemplary embodiment, after the setting operation is performed, the information processing apparatus 101 does not switch an access point, which is a connection destination. Thus, this access point is also an access point with which the information processing apparatus 101 is currently connected in step S200. The information includes information (the SSID and information indicating the encryption method) for connecting to the access point with which the information processing apparatus 101 is wirelessly connected using Wi-Fi. The acquired information is saved in a predetermined storage area of a memory of the information processing apparatus 101. If the information processing apparatus 101 is not connected to any access point using Wi-Fi when the setting operation is performed, this process is omitted.

Next, in step S201, the CPU 103 instructs the OS of the information processing apparatus 101 to search for an access point near the information processing apparatus 101 and uses the setting application to acquire the result of the search.

Next, in step S202, the CPU 103 determines whether the result of the search acquired in step S201 includes an access point enabled by the communication apparatus 151 operating in the network setup mode. As described above, in the present exemplary embodiment, the SSID of the access point enabled by the communication apparatus 151 operating in the network setup mode includes a predetermined character string recognized in advance by the setting application. Thus, in this determination, specifically, the CPU 103 determines whether the result of the search acquired in step S201 includes an access point having an SSID including the predetermined character string. If the determination is YES (YES in step S202), the processing proceeds to step S203. If the determination is NO (NO in step S202), the processing proceeds to step S219.

In step S203, the CPU 103 attempts to establish a Wi-Fi connection between the access point included in the result of the search and enabled by the communication apparatus 151 operating in the network setup mode and the information processing apparatus 101. The Wi-Fi connection is equivalent to a Wi-Fi connection between the communication apparatus 151 operating in the network setup mode and the information processing apparatus 101.

Next, in step S204, the CPU 103 determines whether the establishment of the Wi-Fi connection in step S203 is successful. If the determination is YES (YES in step S204), the processing proceeds to step S205. If the determination is NO (NO in step S204), the processing proceeds to step S219.

In step S205, the CPU 103 acquires capability information regarding the information processing apparatus 101 from the OS. In the present exemplary embodiment, the capability information includes information indicating whether the information processing apparatus 101 is compatible with Wi-Fi Easy Connect. The content of the capability information differs depending on the model or the model number of the information processing apparatus 101.

Next, in step S206, the CPU 103 determines whether the information processing apparatus 101 is connected with an access point using Wi-Fi when the setting operation is performed, and the information processing apparatus 101 is compatible with Wi-Fi Easy Connect. In this step, for example, if the information processing apparatus 101 is not connected with an access point using Wi-Fi when the setting operation is performed, the determination is NO. For example, if the information processing apparatus 101 is connected with an access point using Wi-Fi when the setting operation is performed, but the information processing apparatus 101 is incompatible with Wi-Fi Easy Connect, the determination is NO. The determination of whether the information processing apparatus 101 is connected with an access point using Wi-Fi when the setting operation is performed is made based on whether information regarding the connected AP is saved in the predetermined storage area. The determination of whether the information processing apparatus 101 is compatible with Wi-Fi Easy Connect is made based on the content of the capability information acquired in step S205. If the determination is YES (YES in step S206), the processing proceeds to step S207. If the determination is NO (NO in step S206), the processing proceeds to step S224.

In step S207, the CPU 103 attempts to acquire various pieces of information from the communication apparatus 151 via the Wi-Fi connection between the access point enabled by the communication apparatus 151 operating in the network setup mode and the information processing apparatus 101. As described above, in the communication via the Wi-Fi connection between the access point enabled by the communication apparatus 151 operating in the network setup mode and the information processing apparatus 101, the setup communication protocol is used. The acquired information includes, for example, the Wi-Fi Easy Connect-related information and information indicating whether the communication apparatus 151 is compatible with Wi-Fi Easy Connect. The information indicating whether the communication apparatus 151 is compatible with Wi-Fi Easy Connect is information indicating whether the communication apparatus 151 is compatible with DPP and is operating in the DPP standby mode. If the communication apparatus 151 is incompatible with Wi-Fi Easy Connect, information indicating that the communication apparatus 151 is incompatible with Wi-Fi Easy Connect is acquired, and the Wi-Fi Easy Connect-related information is not acquired. If the communication apparatus 151 is incompatible with Wi-Fi Easy Connect, neither the Wi-Fi Easy Connect-related information nor the information indicating whether the communication apparatus 151 is compatible with Wi-Fi Easy Connect may be acquired. Generally, the Wi-Fi Easy Connect-related information can also be acquired by the communication apparatus 151 displaying a Quick Response (QR) code corresponding to the Wi-Fi Easy Connect-related information on a display unit and by the information processing apparatus 101 reading the QR code using a camera unit. In the present exemplary embodiment, however, the Wi-Fi Easy Connect-related information is acquired via the Wi-Fi connection between the access point enabled by the communication apparatus 151 operating in the network setup mode and the information processing apparatus 101. Accordingly, even if the communication apparatus 151 does not include a display unit for displaying the QR code, or the information processing apparatus 101 does not include a camera unit for reading the QR code, the information processing apparatus 101 can acquire the Wi-Fi Easy Connect-related information.

Next, in step S208, based on the information acquired in step S207, the CPU 103 determines whether the communication apparatus 151 is compatible with Wi-Fi Easy Connect. The communication apparatus 151 being compatible with Wi-Fi Easy Connect means that the communication apparatus 151 is compatible with DPP and is operating in the DPP standby mode. If information indicating that the communication apparatus 151 is compatible with Wi-Fi Easy Connect is acquired, the determination is YES. If the information indicating that the communication apparatus 151 is compatible with Wi-Fi Easy Connect is not acquired, the determination is NO. If the determination is YES (YES in step S208), the processing proceeds to step S209. If the determination is NO (NO in step S208), the processing proceeds to step S224. If the information is not acquired in step S207, the result of this determination is NO.

Next, in step S209, the CPU 103 determines whether the Wi-Fi Easy Connect-related information is acquired from the communication apparatus 151 in step S207. If the determination is YES (YES in step S209), the processing proceeds to step S210. If the determination is NO (NO in step S209), the processing proceeds to step S222. The case where the determination is NO is, for example, a case where the information indicating that the communication apparatus 151 is compatible with Wi-Fi Easy Connect is acquired, but the Wi-Fi Easy Connect-related information is not acquired due to a communication error.

In step S210, the CPU 103 acquires capability information regarding the communication apparatus 151 via the Wi-Fi connection between the access point enabled by the communication apparatus 151 operating in the network setup mode and the information processing apparatus 101. In the present exemplary embodiment, the capability information regarding the communication apparatus 151 includes information indicating encryption methods with which the communication apparatus 151 is compatible and information indicating frequency bands with which the communication apparatus 151 is compatible. The encryption methods with which the communication apparatus 151 is compatible are, for example, Wi-Fi Protected Access (WPA), WPA2, and WPA3. The information indicating the frequency bands with which the communication apparatus 151 is compatible may be information indicating communication channels corresponding to the frequency bands with which the communication apparatus 151 is compatible (channel information). In a form described below in which a determination regarding the encryption methods with which the communication apparatus 151 is compatible and a determination regarding the frequency bands with which the communication apparatus 151 is compatible are not made, this process may be omitted. The capability information may be included in advance in the setting application. That is, the CPU 103 may identify capability information corresponding to the communication apparatus 151 among a plurality of pieces of capability information prepared according to the types or the model numbers of communication apparatuses and included in advance in the setting application and acquire the identified capability information from the setting application.

Next, in step S211, based on the capability information acquired in step S210, the CPU 103 determines whether the encryption method used to connect to the connected AP is an encryption method with which the communication apparatus 151 is compatible. In the present exemplary embodiment, encryption methods with which the communication apparatus 151 is compatible are WPA, WPA2, and WPA3, and an encryption method with which the communication apparatus 151 is incompatible is Wired Equivalent Privacy (WEP). If the determination is YES (YES in step S211), the processing proceeds to step S212. If the determination is NO (NO in step S211), the processing proceeds to step S224. This determination may be made at another timing. Specifically, for example, this determination may be made after the determination is YES in step S204. If the determination is YES, the processing may proceed to step S205. If the determination is NO, the processing may proceed to step S224.

Next, in step S212, the CPU 103 determines whether the encryption method used to connect to the connected AP is an encryption method compatible with Wi-Fi Easy Connect (compatible with DPP). Encryption methods compatible with Wi-Fi Easy Connect are, for example, WPA2 and WPA3, and encryption methods incompatible with Wi-Fi Easy Connect are, for example, WPA and WEP. Based on information held in advance in the setting application or information acquired from the communication apparatus 151, the CPU 103 may identify which encryption method is compatible with Wi-Fi Easy Connect. If the determination is YES (YES in step S212), the processing proceeds to step S213. If the determination is NO (NO in step S212), the processing proceeds to step S224.

Next, in step S213, based on the capability information acquired in step S210, the CPU 103 determines whether the frequency band used to connect to the connected AP is a frequency band with which the communication apparatus 151 is compatible. In the present exemplary embodiment, the communication apparatus 151 has a type compatible with both the 2.4 GHz frequency band and the 5 GHz frequency band, and a type compatible with the 2.4 GHz frequency band but incompatible with the 5 GHz frequency band.

Then, the communication apparatus 151 cannot connect to an access point depending on the frequency band with which the communication apparatus 151 is incompatible. Thus, for example, if the frequency band used to connect to the connected AP is the 5 GHz frequency band and the communication apparatus 151 is incompatible with the 5 GHz frequency band, the result of this determination is NO. If the determination is YES (YES in step S213), the processing proceeds to step S214. If the determination is NO (NO in step S213), the processing proceeds to step S224.

In step S214, the CPU 103 disconnects the Wi-Fi connection between the access point enabled by the communication apparatus 151 operating in the network setup mode and the information processing apparatus 101.

Next, in step S215, the CPU 103 establishes a connection again between the access point with which the information processing apparatus 101 is connected using Wi-Fi when the setting operation is performed and the information processing apparatus 101. In Wi-Fi Easy Connect, information regarding an access point with which the information processing apparatus 101 is connected when Wi-Fi Easy Connect is executed is transmitted. Thus, this process is executed in preparation for the execution of Wi-Fi Easy Connect in step S216.

Next, in step S216, the CPU 103 executes a process for executing Wi-Fi Easy Connect using the acquired Wi-Fi Easy Connect-related information. In the present exemplary embodiment, the setting application does not directly execute Wi-Fi Easy Connect, but performs the process of starting an OS standard Wi-Fi Easy Connect application program (hereinafter, a "Wi-Fi Easy Connect application") as the process for executing Wi-Fi Easy Connect. Then, the Wi-Fi Easy Connect application executes an application programming interface (API) for Wi-Fi Easy Connect and requests the OS to execute Wi-Fi Easy Connect, whereby the OS executes Wi-Fi Easy Connect. Alternatively, the setting application may execute the API for Wi-Fi Easy Connect and request the OS to execute Wi-Fi Easy Connect, and the process for executing Wi-Fi Easy Connect may be this execution request. The details of this process will be described below.

In step S217, the CPU 103 determines whether the establishment of a connection between the access point and the communication apparatus 151 using executed Wi-Fi Easy Connect is successful. This determination is made based on information indicating whether the execution of Wi-Fi Easy Connect is cancelled, or information acquired from the communication apparatus 151 and indicating the success or failure of the connection to the access point. If the determination is YES (YES in step S217), the processing ends. If the determination is NO (NO in step S217), the processing proceeds to step S218.

In step S218, the CPU 103 determines whether the cause of the failure of the establishment of the connection between the access point and the communication apparatus 151 using executed Wi-Fi Easy Connect is a particular cause. In the present exemplary embodiment, information regarding the cause of the failure of the establishment of the connection between the access point and the communication apparatus 151 using executed Wi-Fi Easy Connect is acquired from the communication apparatus 151. The determination is made based on this information. In the present exemplary embodiment, the particular cause is, for example, the fact that an error occurs in the communication in Wi-Fi Easy Connect (cause 1) or the fact that the encryption method used to connect the information processing apparatus 101 and the access point is an encryption method with which the communication apparatus 151 is incompatible (cause 2). The particular cause is, for example, the fact that the encryption method used to connect the information processing apparatus 101 and the access point is an encryption method with which Wi-Fi Easy Connect is incompatible (cause 3). The failure of the connection due to the cause 2 or 3 can occur in a case where Wi-Fi Easy Connect is executed after the determination is YES in step S221. This is because in a case where Wi-Fi Easy Connect is executed after the determination is YES in step S221, the capability information regarding the communication apparatus 151 is not acquired and the determinations in steps S211 and S212 are not made, unlike a case where Wi-Fi Easy Connect is executed after step S215. If the determination is YES (YES in step S218), the processing proceeds to step S224. If the determination is NO (NO in step S218), the processing ends.

The process of step S217 or S218 may be omitted. Specifically, for example, after step S216, the processing may end without executing steps S217 and S218. Alternatively, if the determination is NO in step S217, the processing may end without executing step S218.

Next, a description is given of step S219, which is executed if the determination is NO in step S202 or if the determination is NO in step S204. In step S219, the CPU 103 determines whether the information processing apparatus 101 is connected with an access point using Wi-Fi when the setting operation is performed. This determination is made based on whether information regarding an access point is saved in the predetermined storage area. If the determination is YES (YES in step S219), the processing proceeds to step S220. If the determination is NO (NO in step S219), the processing ends.

In step S220, the CPU 103 attempts to acquire the Wi-Fi Easy Connect-related information by a method different from the method for acquiring the Wi-Fi Easy Connect-related information in step S207. Specifically, for example, the CPU 103 attempts to acquire the Wi-Fi Easy Connect-related information by reading a QR code. FIG. 3 is an example of a QR code capturing screen displayed by the setting application. A QR code capturing screen 300 displays a frame 301. Further, the screen 300 displays an image captured by the camera unit included in the information processing apparatus 101. The user operates the information processing apparatus 101 so that a QR code captured by the camera unit and displayed on the communication apparatus 151 falls within the frame 301. If it is detected that the QR code falls within the frame 301, the CPU 103 analyzes the QR code and acquires the Wi-Fi Easy Connect-related information. The acquisition of the Wi-Fi Easy Connect-related information is not limited to this form. For example, the Wi-Fi Easy Connect-related information may be acquired from the communication apparatus 151 using NFC or Bluetooth Low Energy. If the communication apparatus 151 is incompatible with Wi-Fi Easy Connect, the communication apparatus 151 cannot display the QR code or transmit the Wi-Fi Easy Connect-related information using NFC or Bluetooth Low Energy. In this case, the CPU 103 receives a cancellation operation on the setting application from the user, whereby the processing ends. The QR code capturing screen 300 may be displayed by an application program other than the setting application (e.g., the Wi-Fi Easy Connect application or another image capturing application program).

Next, in step S221, the CPU 103 determines whether the Wi-Fi Easy Connect-related information is acquired in step S220.

If the determination is YES (YES in step S221), the processing proceeds to step S216. If the determination is NO (NO in step S221), the processing ends. For example, if the QR code read in step S220 is not the QR code for acquiring the Wi-Fi Easy Connect-related information or if the reading of the QR code fails, the determination is NO. If the determination is NO, the processing may proceed to step S224 instead of ending. If the determination is YES in step S221, the CPU 103 may determine whether the encryption method used to connect to the connected AP is an encryption method compatible with Wi-Fi Easy Connect (compatible with DPP). Then, if the determination is YES, the processing may proceed to step S216. If the determination is NO, the processing may end or proceed to step S224. In this case, based on information held in advance in the setting application, the CPU 103 identifies which encryption method is compatible with Wi-Fi Easy Connect.

Next, a description will be given of step S222, which is executed if the determination is NO in step S209. In step S222, the CPU 103 disconnects the Wi-Fi connection between the access point enabled by the communication apparatus 151 operating in the network setup mode and the information processing apparatus 101.

Next, in step S223, the CPU 103 establishes a connection again between the access point with which the information processing apparatus 101 is connected using Wi-Fi when the setting operation is performed and the information processing apparatus 101. Then, the processing proceeds to step S220.

As described above, in the present exemplary embodiment, if the Wi-Fi Easy Connect-related information is not acquired via the Wi-Fi connection between the communication apparatus 151 operating in the network setup mode and the information processing apparatus 101, the information processing apparatus 101 attempts to acquire the Wi-Fi Easy Connect-related information by another method. Specifically, for example, the information processing apparatus 101 attempts to acquire the Wi-Fi Easy Connect-related information by reading a QR code. Consequently, even if the Wi-Fi Easy Connect-related information cannot be acquired via the Wi-Fi connection between the communication apparatus 151 operating in the network setup mode and the information processing apparatus 101, Wi-Fi Easy Connect can be executed.

Next, a description will be given of step S224, which is executed if the determination is NO in step S206, or if the determination is NO in step S208, or if the determination is NO in any of steps S211 to S213, or if the determination is YES in step S218. In step S224, the CPU 103 executes network setup of the communication apparatus 151 by a method different from Wi-Fi Easy Connect. In the present exemplary embodiment, the method different from Wi-Fi Easy Connect is a method for executing network setup of the communication apparatus 151 using the setup communication protocol, which is a protocol different from a Wi-Fi Easy Connect protocol (DPP). The details of this process will be described below. Then, the processing ends.

The content of the processing of the above flowchart is not limited to the above content. For example, if the Wi-Fi Easy Connect-related information cannot be acquired via the Wi-Fi connection between the communication apparatus 151 operating in the network setup mode and the information processing apparatus 101, the CPU 103 may end the processing without attempting to acquire the Wi-Fi Easy Connect-related information by another method. Specifically, the case where the Wi-Fi Easy Connect-related information cannot be acquired via the Wi-Fi connection between the communication apparatus 151 operating in the network setup mode and the information processing apparatus 101 is, for example, a case where the determination is NO in step S202, or a case where the determination is NO in step S204, or a case where the determination is NO in step S209. That is, if the determination is NO in step S202, or if the determination is NO in step S204, or if the determination is NO in step S209, the CPU 103 may end the processing without executing the subsequent processes (steps S219 to S223).

For example, in the above description, after step S207, two determinations in steps S208 and S209 are made. The present invention, however, is not limited to this form. For example, the following form may be employed. After step S207, instead of the two determinations in steps S208 and S209, it may be determined whether the Wi-Fi Easy Connect-related information is acquired. Then, if the result of the determination is YES, the processing may proceed to step S210. If the result of the determination is NO, the processing may proceed to step S224, and the processes of steps S220 to S223 may not be executed.

In the present exemplary embodiment, the encryption methods with which the communication apparatus 151 is compatible include the encryption method compatible with Wi-Fi Easy Connect. Thus, a form may be employed in which the determination in step S211 is not made. Specifically, for example, after step S210, the determination in step S211 may not be made, and the determination in step S212 may be made.

Alternatively, a form may be employed in which encryption methods with which Wi-Fi Easy Connect is compatible include an encryption method with which the communication apparatus 151 is compatible. For example, a form may be employed in which an encryption method with which the communication apparatus 151 is compatible is only WPA3, and encryption methods compatible with Wi-Fi Easy Connect are WPA2 and WPA3. In this case, a form may be employed in which the determination in step S212 is not made. Specifically, for example, after the determination is YES in step S211, the determination in step S212 may not be made, and the determination in step S213 may be made.

Figure 4:
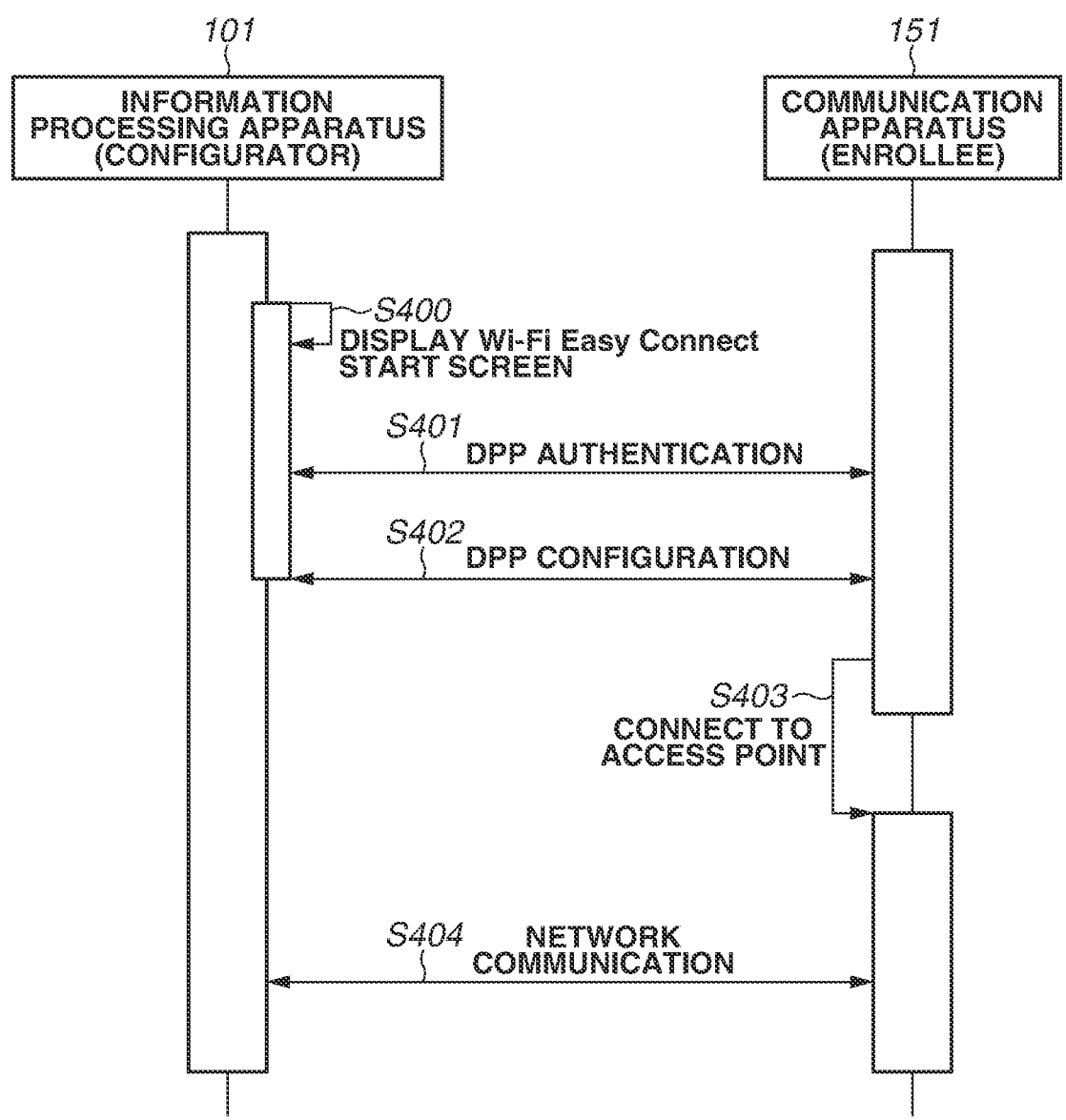
FIG. 4 is a sequence diagram illustrating a process executed by the information processing apparatus and the communication apparatus.

A description will be given of the process executed by the information processing apparatus 101 and the communication apparatus 151 in step S216, with reference to FIG. 4. A sequence illustrated in FIG. 4 is achieved, for example, by the CPU of each apparatus loading a program stored in the ROM of the apparatus or the external storage device into the RAM of the apparatus and executing the program.

First, in step S400, by the function of the OS, the information processing apparatus 101 starts Wi-Fi Easy Connect using DPP. Specifically, first, the information processing apparatus 101 uses the setting application to instruct the OS to start the Wi-Fi Easy Connect application, thereby starting the Wi-Fi Easy Connect application. Consequently, the Wi-Fi Easy Connect application operates in the foreground, and the setting application operates in the background. For example, the execution of this instruction is equivalent to an instruction to execute Wi-Fi Easy Connect.

Figure 5:
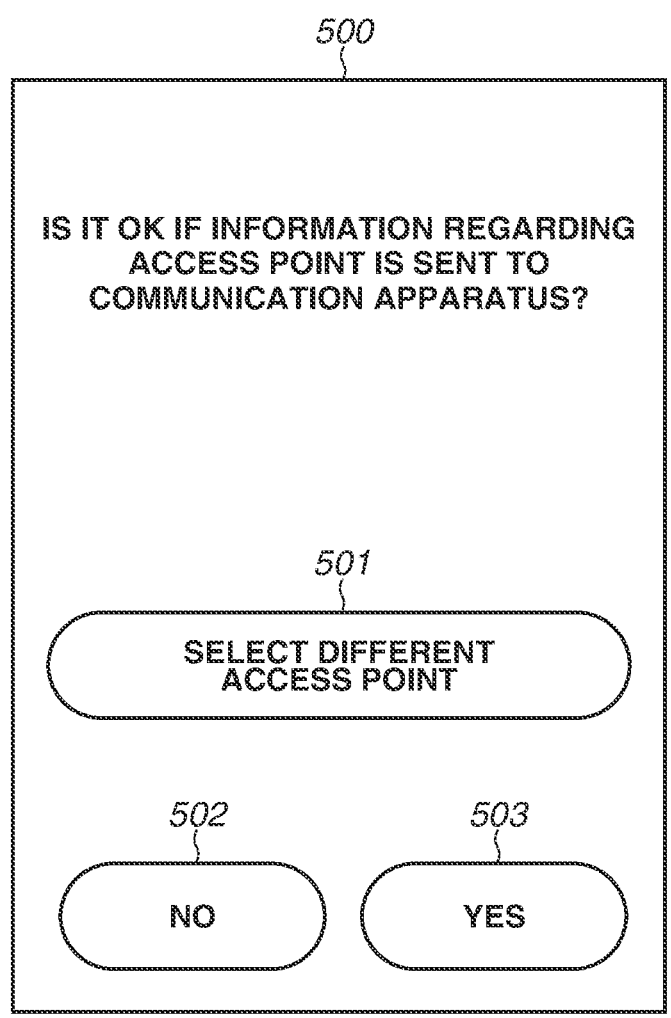
FIG. 5 is an example of a Wi-Fi Easy Connect start screen.

Consequently, the information processing apparatus 101 uses the Wi-Fi Easy Connect application to display a Wi-Fi Easy Connect start screen. The Wi-Fi Easy Connect application is a program installed in advance on the information processing apparatus 101 and is a program provided by the OS vendor of the information processing apparatus 101. If the Wi-Fi Easy Connect application is started, the Wi-Fi Easy Connect-related information acquired by the setting application is provided to the Wi-Fi Easy Connect application. FIG. 5 is an example of the Wi-Fi Easy Connect start screen displayed by the Wi-Fi Easy Connect application. A Wi-Fi Easy Connect start screen 500 displays areas 501, 502, and 503.

The area 501 is an area for changing an access point set as a setting target of Wi-Fi Easy Connect. Before the area 501 is operated, the access point set as the setting target of Wi-Fi Easy Connect is the access point with which the information processing apparatus 101 is currently connected. If the area 501 is selected, the information processing apparatus 101 displays a list of access points and newly sets an access point selected from the list by the user as a setting target of Wi-Fi Easy Connect. The list of access points includes, for example, an access point found as a result of an AP search by the information processing apparatus 101 and an access point to which the information processing apparatus 101 has connected. The area 502 is an area for cancelling the execution of Wi-Fi Easy Connect. The area 503 is an area for giving an instruction to execute Wi-Fi Easy Connect. If the area 502 is operated, the processing of this sequence diagram ends, and the processing proceeds to step S217. In this case, it is considered that Wi-Fi Easy Connect fails.

If the area 503 is pressed, the processing proceeds to step S401.

In step S401, the Wi-Fi Easy Connect application executes the API for Wi-Fi Easy Connect using the Wi-Fi Easy Connect-related information and information regarding the access point set as the setting target of Wi-Fi Easy Connect, thereby instructing the OS to execute Wi-Fi Easy Connect. Then, by the function of the OS, the information processing apparatus 101 and the communication apparatus 151 execute a process termed "DPP authentication". In the DPP authentication, the information processing apparatus 101 and the communication apparatus 151 communicate authentication information and information used to encrypt information, thereby authenticating communication between the apparatuses. Various pieces of information transmitted from the information processing apparatus 101 in the communication in the DPP authentication are encrypted by the information processing apparatus 101 based on the Wi-Fi Easy Connect-related information acquired in the processing illustrated in FIG. 2. In the DPP authentication, specifically, first, the information processing apparatus 101 transmits an authentication request as a request for network setup using DPP. Next, the communication apparatus 151 that operates in the DPP standby mode is operating in the DPP standby mode, which is the mode of waiting for an authentication request, and thus receives the authentication request transmitted from the information processing apparatus 101. The communication apparatus 151 having received the authentication request attempts to decrypt the received authentication request using a decryption key currently held in the communication apparatus 151.

Then, if the decryption is successful, the communication apparatus 151 transmits an authentication response to the information processing apparatus 101 and authenticates the communication with the information processing apparatus 101. If the information processing apparatus 101 has not acquired correct Wi-Fi Easy Connect-related information and correctly encrypted information, the decryption by the communication apparatus 151 fails. Thus, the authentication fails, and the authentication response is not transmitted. The DPP authentication is completed when the authentication response is received by the information processing apparatus 101. In the DPP authentication, the communication is executed using DPP.

Next, in step S402, by the function of the OS, a process termed "DPP configuration" is executed between the information processing apparatus 101 and the communication apparatus 151. In the DPP configuration, the information processing apparatus 101 transmits connection information for connecting to the access point set as the setting target of Wi-Fi Easy Connect to the communication apparatus 151, using Wi-Fi Easy Connect. The connection information includes the SSID, the password, and information indicating the encryption method regarding the access point set as the setting target of Wi-Fi Easy Connect. The password transmitted at this time is information input by the user on a screen displayed by an OS-compatible application when the connection between the information processing apparatus 101 and the access point is established.

The password is also information held in the OS when the connection between the information processing apparatus 101 and the access point is established. The password is information that is not held in the setting application.

Since the password transmitted at this time is information already held in the OS and the DPP configuration is a process executed by the OS, the password does not need to be newly input by the user on a screen displayed by the setting application. The connection information is transmitted using Wi-Fi Easy Connect as in the present exemplary embodiment, whereby it is possible to transmit the password to the communication apparatus 151 through secure communication without newly receiving the input of the password from the user on the screen displayed by the setting application. Also in the DPP configuration, the communication is executed using DPP.

In step S403, the communication apparatus 151 ends the network setup mode and transitions to the infrastructure mode. Then, using the connection information acquired using Wi-Fi Easy Connect, the communication apparatus 151 attempts to connect to the access point corresponding to the connection information. If the connection is successful, the communication apparatus 151 can communicate via a network formed by the access point to which the communication apparatus 151 connects. The communication via the network formed by the access point with which the communication apparatus 151 is connected is executed according to a protocol different from DPP (specifically, for example, Port 9100, SNMP, or a protocol specific to the vendor of the communication apparatus 151). The communication apparatus 151 may transmit information indicating the success or failure of the connection to the access point corresponding to the connection information acquired using Wi-Fi Easy Connect to the information processing apparatus 101. Further, if the connection to the access point corresponding to the connection information acquired using Wi-Fi Easy Connect fails, the communication apparatus 151 may transmit information indicating the cause of the failure to the information processing apparatus 101. The transmission of these pieces of information may be executed using DPP. Examples of the cause of the failure of the connection to the access point corresponding to the connection information acquired using Wi-Fi Easy Connect include an error in the communication in Wi-Fi Easy Connect, the fact that the access point is not found, and the fact that the Wi-Fi Easy Connect-related information acquired from the communication apparatus 151 is not appropriate information. Examples of the cause of the failure also include the fact that the encryption method used to connect to the access point set as the setting target of Wi-Fi Easy Connect is an encryption method with which the communication apparatus 151 is incompatible. Examples of the cause of the failure also include the fact that the encryption method used to connect to the access point set as the setting target of Wi-Fi Easy Connect is an encryption method with which Wi-Fi Easy Connect is incompatible. The information processing apparatus 101 may display information indicating the success or failure of the connection to the access point corresponding to the connection information acquired using Wi-Fi Easy Connect on the display unit 108. Further, if the connection to the access point corresponding to the connection information acquired using Wi-Fi Easy Connect fails, the information processing apparatus 101 may display information indicating the cause of the failure on the display unit 108.

In step S404, based on the completion of the execution of Wi-Fi Easy Connect, the information processing apparatus 101 switches the application operating in the foreground from the Wi-Fi Easy Connect application to the setting application. Then, the information processing apparatus 101 searches for the communication apparatus 151 on the network to which the information processing apparatus 101 belongs. This process is achieved by the setting application that has received a notification indicating the completion of the execution of Wi-Fi Easy Connect from the OS. Then, if the communication apparatus 151 is found, the information processing apparatus 101 requests the capability information from the communication apparatus 151, and the communication apparatus 151 transmits the capability information to the information processing apparatus 101. Consequently, the information processing apparatus 101 registers information regarding the communication apparatus 151 on the setting application, and the setting application can communicate with the communication apparatus 151 from this point onward. Specifically, for example, the setting application can transmit a print job to the communication apparatus 151. At this time, if the information processing apparatus 101 belongs to the network formed by the access point to which the communication apparatus 151 had connected using Wi-Fi Easy Connect, the information processing apparatus 101 can communicate with the communication apparatus 151 via the access point. If the information processing apparatus 101 and the communication apparatus 151 cannot communicate with each other, e.g., if the access point to which the communication apparatus 151 had connected is not the access point with which the information processing apparatus 101 is connected, the request for the capability information and the acquisition of the capability information are omitted. The communication in step S404 is executed, for example, using a communication protocol different from DPP and the setup communication protocol. Then, the processing of this sequence diagram ends, and the processing proceeds to step S217.

A description has been given above of a form in which the Wi-Fi Easy Connect application displays the Wi-Fi Easy Connect start screen, and the Wi-Fi Easy Connect application executes the API for Wi-Fi Easy Connect, thereby instructing the OS to execute Wi-Fi Easy Connect. The present invention, however, is not limited to this form. For example, the setting application may display the Wi-Fi Easy Connect start screen. A form may be employed in which the setting application executes the API for Wi-Fi Easy Connect, thereby instructing the OS to execute Wi-Fi Easy Connect.

Figure 6:
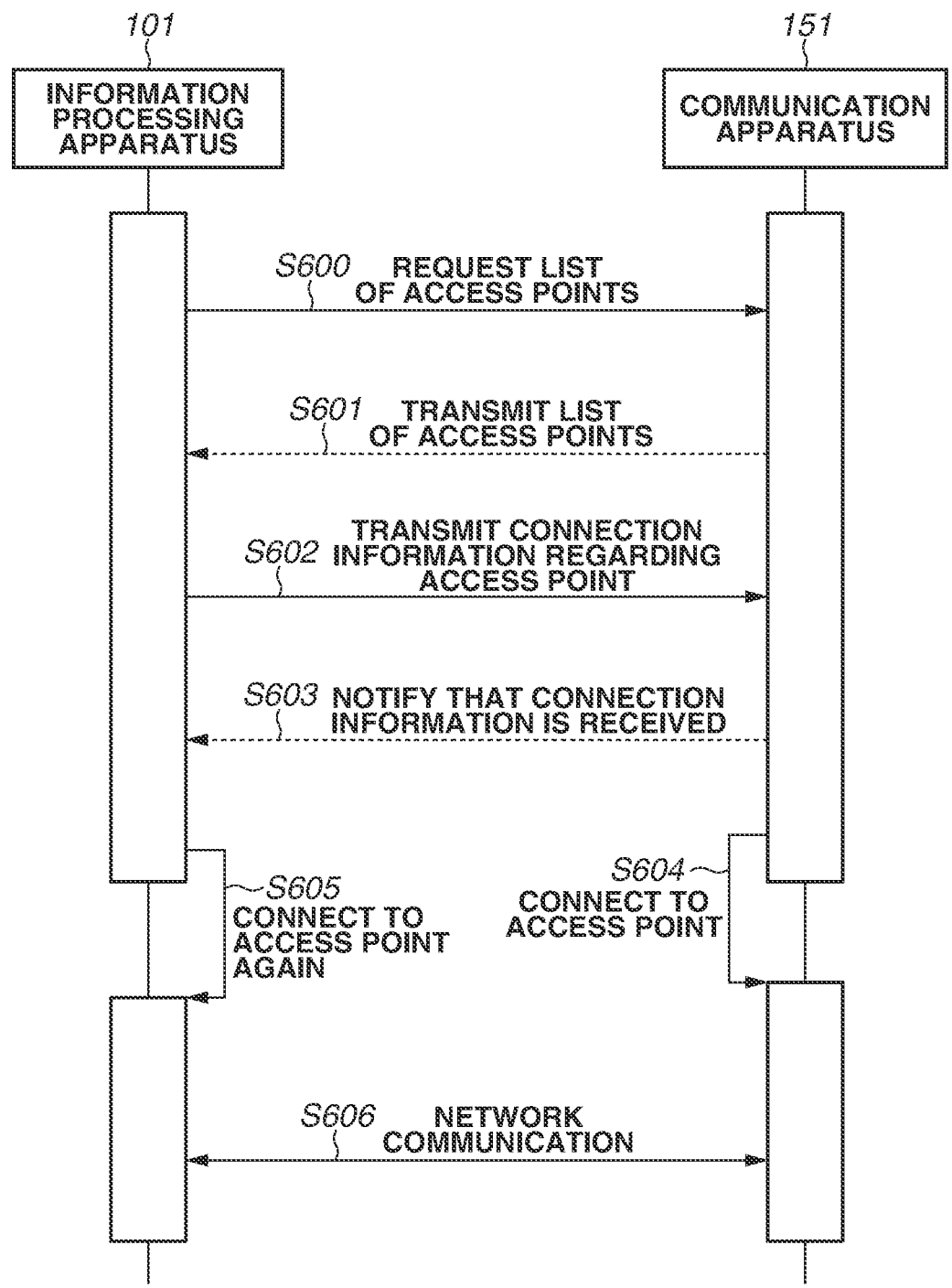
FIG. 6 is a sequence diagram illustrating a process executed by the information processing apparatus and the communication apparatus.

Next, a description will be given of the process executed by the information processing apparatus 101 and the communication apparatus 151 in step S224, with reference to FIG. 6. A sequence illustrated in FIG. 6 is achieved, for example, by the CPU of each apparatus loading a program stored in the ROM of the apparatus or the external storage device into the RAM of the apparatus and executing the program. As described above, in the communication via the Wi-Fi connection between the communication apparatus 151 operating in the network setup mode and the information processing apparatus 101, the setup communication protocol is used.

In step S600, the information processing apparatus 101 uses the setting application to request a list of access points from the communication apparatus 151 via the Wi-Fi connection between the communication apparatus 151 operating in the network setup mode and the information processing apparatus 101.

Next, in step S601, the communication apparatus 151 transmits the list of access points to the information processing apparatus 101 via the Wi-Fi connection between the communication apparatus 151 operating in the network setup mode and the information processing apparatus 101. The list transmitted at this time is a list indicating one or more access points which are found by the communication apparatus 151 executing an AP search and to which the communication apparatus 151 can connect.

Next, in step S602, the information processing apparatus 101 transmits connection information regarding any of the access points included in the received list to the communication apparatus 151 via the Wi-Fi connection between the communication apparatus 151 operating in the network setup mode and the information processing apparatus 101.

This process is achieved by the setting application controlling the information processing apparatus 101 to transmit connection information regarding any of the access points included in the received list. In this process, specifically, if the connected AP is included in the received list, the information processing apparatus 101 transmits connection information regarding the connected AP. In the present exemplary embodiment, since the list includes only access points to which the communication apparatus 151 can connect, the case where the connected AP is included in the received list is a case where the communication apparatus 151 can connect to the connected AP. If the connected AP is not included in the received list, the information processing apparatus 101 displays the received list and receives the selection of any of the access points from the list from the user.

Then, the information processing apparatus 101 transmits connection information regarding the selected access point. In the present exemplary embodiment, since the list includes only access points to which the communication apparatus 151 can connect, the case where the connected AP is not included in the received list is a case where the communication apparatus 151 cannot connect to the connected AP. The communication apparatus 151 cannot connect to an access point to which a connection can be made using an encryption method incompatible with the communication apparatus 151. Thus, such an access point is not included in the list. The communication apparatus 151 cannot connect to an access point to which a connection can be made using a frequency band incompatible with the communication apparatus 151. Thus, such an access point is not included in the list. Thus, in step S224, which is executed if the determination is NO in step S211 or if the determination is NO in step S213, connection information regarding an access point different from the connected AP is transmitted. If the determination is NO in step S212, there is also a case where the connected AP and the communication apparatus 151 can connect to each other, and therefore, the connection information regarding the connected AP can be transmitted, or the connection information regarding the access point different from the connected AP can be transmitted. The present invention is not limited to this form. The list may always be displayed, and the selection of an access point may be received from the user each time. Before the connection information is transmitted, the information processing apparatus 101 receives the input of the password for connecting to the access point from the user on the screen displayed by the setting application. Then, the information processing apparatus 101 includes the received password in the connection information and transmits the connection information.

In step S603, the communication apparatus 151 notifies the information processing apparatus 101, via the Wi-Fi connection between the communication apparatus 151 operating in the network setup mode and the information processing apparatus 101, that the connection information is received.

In step S604, the communication apparatus 151 ends the network setup mode and transitions to the infrastructure mode. Then, using the connection information acquired in step S602, the communication apparatus 151 attempts to connect to the access point corresponding to the connection information. If the connection is successful, the communication apparatus 151 can communicate via a network formed by the access point to which the communication apparatus 151 connects.

In step S605, using the saved connection information, the information processing apparatus 101 uses the setting application to connect again to the access point with which the information processing apparatus 101 is connected when the setting operation is performed. The present invention is not limited to this form. For example, if the connection information regarding another access point different from the access point with which the information processing apparatus 101 is connected using Wi-Fi when the setting operation is performed is transmitted to the communication apparatus 151, the information processing apparatus 101 may connect to the other access point.

In step S606, the information processing apparatus 101 uses the setting application to search for the communication apparatus 151 on the network to which the information processing apparatus 101 belongs. Then, if the communication apparatus 151 is found, the information processing apparatus 101 requests the capability information from the communication apparatus 151, and the communication apparatus 151 transmits the capability information to the information processing apparatus 101. Consequently, the information processing apparatus 101 registers information regarding the communication apparatus 151 on the setting application, and the setting application can communicate with the communication apparatus 151 from this point onward. Specifically, for example, the setting application can transmit a print job to the communication apparatus 151. At this time, if the information processing apparatus 101 belongs to the network formed by the access point with which the communication apparatus 151 connects using network setup, the information processing apparatus 101 can communicate with the communication apparatus 151 via the access point. If the information processing apparatus 101 and the communication apparatus 151 cannot communicate with each other, e.g., if the access point to which the communication apparatus 151 connects is not the access point with which the information processing apparatus 101 is connected, the request for the capability information and the acquisition of the capability information are omitted. The communication in step S606 is executed, for example, using a communication protocol (specifically, for example, CHMP) different from DPP and the setup communication protocol. Then, the processing of this sequence diagram ends.

The content of the processing of the above sequence diagram is not limited to the above content. For example, if the access point with which the information processing apparatus 101 is connected using Wi-Fi when the setting operation is performed is not included in the received list, the information processing apparatus 101 may not transmit the connection information regarding the access point, and may not attempt to establish a connection between the communication apparatus 151 and the access point.

Further, the information processing apparatus 101 may receive connection information regarding an access point enabled in the communication apparatus 151 in the AP mode from the communication apparatus 151 and attempt to establish a connection between the communication apparatus 151 operating in the AP mode and the information processing apparatus 101. In this case, the communication apparatus 151 transmits the connection information regarding the access point enabled in the communication apparatus 151 in the AP mode, then ends the network setup mode, and transitions to the AP mode.

Figure 7:
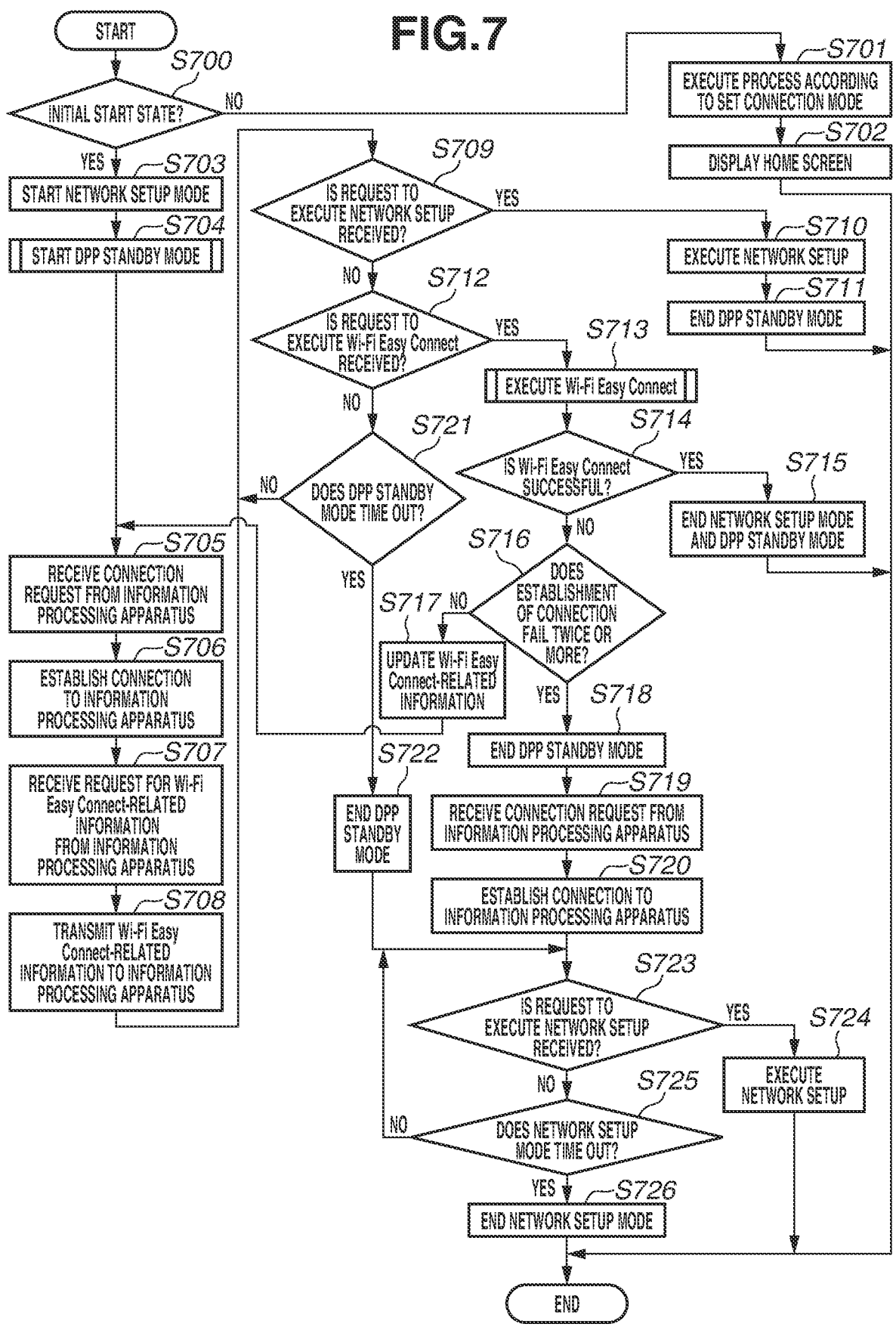
FIG. 7 is a flowchart illustrating a flow of a first setup process executed by the communication apparatus in the network setup process.
Figure 8:
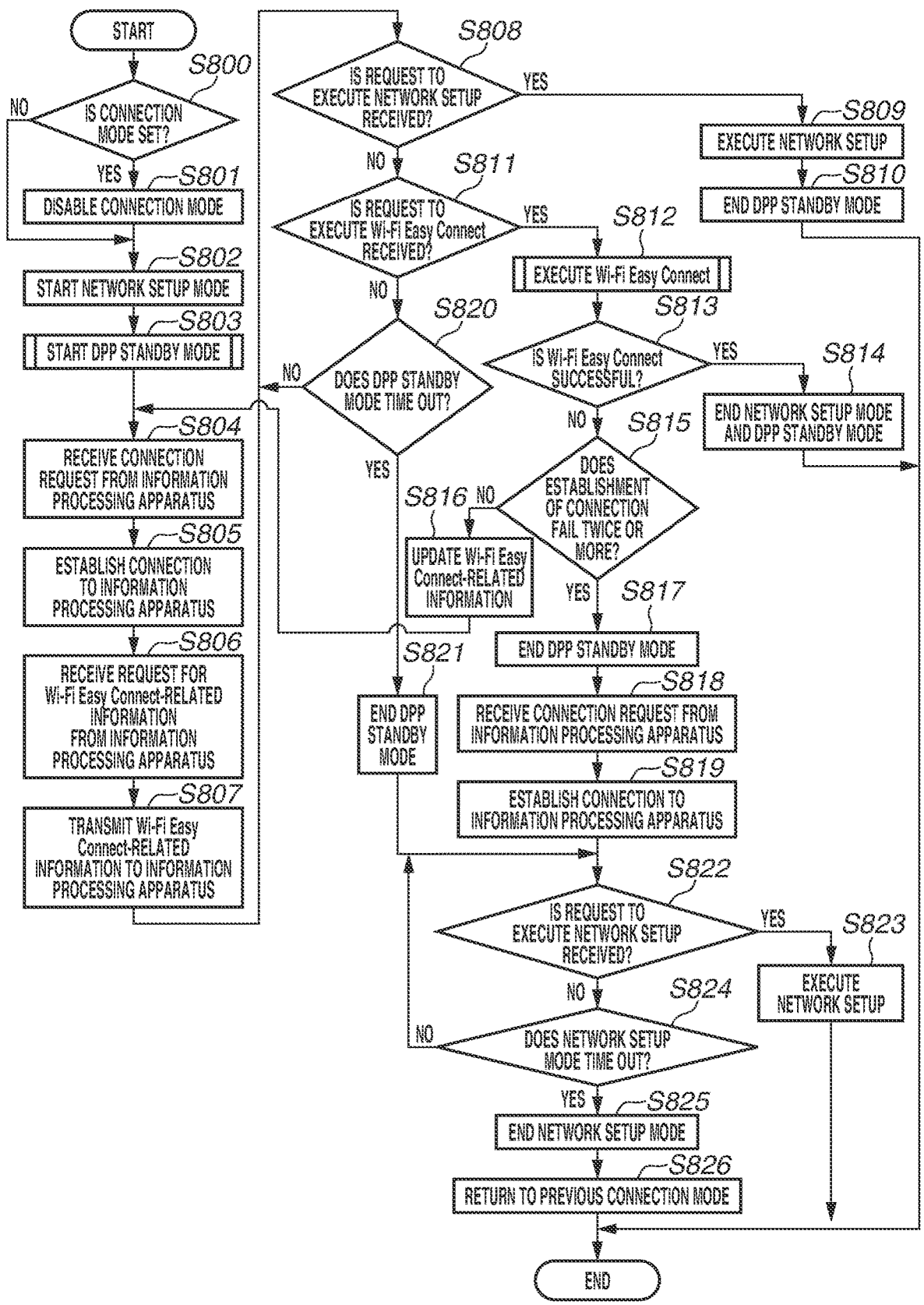
FIG. 8 is a flowchart illustrating a flow of a second setup process executed by the communication apparatus in the network setup process.

FIGS. 7 and 8 are flowcharts illustrating the flow of processing executed by the communication apparatus 151 in the network setup process according to the present exemplary embodiment. In the present exemplary embodiment, the condition under which the communication apparatus 151 starts an operation in the setup mode includes a first condition and a second condition. The first condition is that "the communication apparatus 151 is turned on by executing a power-on operation on the communication apparatus 151 in the state where the initial settings are not completed". The second condition is that "a predetermined operation for network setup is performed on the communication apparatus 151 in the state where the communication apparatus 151 is powered on". With reference to FIGS. 7 and 8, descriptions will be given of processing in the setup mode started based on the first condition and processing in the setup mode started based on the second condition, respectively.

First, the processing in the setup mode started based on the first condition will be described.

Based on the fact that the power-on operation is executed for the first time by the user in a factory shipment state (a shipment arrival state) (i.e., the first condition), the communication apparatus 151 makes the initial settings. The factory shipment state is equivalent to, for example, the state where the communication apparatus 151 has not completed the initial settings. For example, the communication apparatus 151 is shipped from the factory in the state where ink tanks and a print head are not attached to the communication apparatus 151. Thus, as the initial settings, the communication apparatus 151 performs the processes of enabling the use of the communication apparatus 151, such as the process of prompting the user to attach ink tanks and a print head supplied with the communication apparatus 151 to the communication apparatus 151, registration adjustment, and the process of cleaning the print head. Whether the communication apparatus 151 is in the factory shipment state is controlled using a flag (an initial start flag) saved in the RAM 153 or a memory. The communication apparatus 151 is configured to change the state of the initial start flag according to the completion of the initial settings, and not start the initial settings after the completion of the initial settings even when the communication apparatus 151 is powered on. To use the communication apparatus 151, it is desirable to execute network setup of the communication apparatus 151. Thus, in the present exemplary embodiment, the network setup process is executed when the initial settings are made.

FIG. 7 is a flowchart illustrating processing executed by the communication apparatus 151 in a case where the power-on operation is executed on the communication apparatus 151. The flowchart illustrated in FIG. 7 is achieved, for example, by the CPU 154 loading the setting application stored in the ROM 152 or a memory into the RAM 153 and executing the setting application. The flowchart illustrated in FIG. 7 is started based on the fact that the power-on operation is performed.

In step S700, the CPU 154 references the initial start flag saved in the RAM 153 or a memory and determines whether the communication apparatus 151 is in an initial start state. For example, the initial start flag is set to a particular value indicating the initial start state when the communication apparatus 151 is shipped from the factory. If the determination is NO in step S700 (NO in step S700), the processing proceeds to step S701. If the determination is YES in step S700 (YES in step S700), the processing proceeds to step S703. The case where the determination is NO in step S700 is a case where the communication apparatus 151 is powered on in the state where the initial settings of the communication apparatus 151 are already completed.

In step S701, the CPU 154 executes a process according to a set connection mode saved in the RAM 153 or a memory. For example, if the communication apparatus 151 is wirelessly connected with an access point using Wi-Fi when the communication apparatus 151 is turned off by the user, and the infrastructure connection mode is set, the communication apparatus 151 connects to the access point.

In step S702, the CPU 154 displays a standby screen (a home screen), and the processing of this flowchart ends.

In step S703, the CPU 154 causes the communication apparatus 151 to start (enable) an operation in the network setup mode. Specifically, the CPU 154 enables a setup access point. Further, since the CPU 154 ends the network setup mode if the predetermined time elapses, the CPU 154 starts a timeout timer for the network setup mode and counts the time elapsed since the operation in the network setup mode is started.

In step S704, the CPU 154 causes the communication apparatus 151 to start an operation in the DPP standby mode. The DPP standby mode will be described below with reference to FIG. 9. The CPU 154 also starts a timeout timer for the DPP standby mode and counts the time elapsed since the operation in the DPP standby mode is started.

In step S705, the CPU 154 receives a connection request to connect to the setup access point from the information processing apparatus 101.

In step S706, the CPU 154 attempts to establish a Wi-Fi connection. This Wi-Fi connection is equivalent to a Wi-Fi connection between the communication apparatus 151 operating in the network setup mode and the information processing apparatus 101.

In step S707, the CPU 154 receives a request for various pieces of information related to Wi-Fi Easy Connect from the information processing apparatus 101 via the Wi-Fi connection established in step S706. As described above, in the communication via the Wi-Fi connection between the access point enabled by the communication apparatus 151 operating in the network setup mode and the information processing apparatus 101, the network setup communication protocol is used.

In step S708, the CPU 154 transmits the various pieces of information related to Wi-Fi Easy Connect regarding the communication apparatus 151 to the information processing apparatus 101. For example, the various pieces of information related to Wi-Fi Easy Connect regarding the communication apparatus 151 include the Wi-Fi Easy Connect-related information and information indicating whether the communication apparatus 151 is compatible with Wi-Fi Easy Connect. The information indicating whether the communication apparatus 151 is compatible with Wi-Fi Easy Connect is information indicating whether the communication apparatus 151 is compatible with DPP and is operating in the DPP standby mode. If the communication apparatus 151 is incompatible with Wi-Fi Easy Connect, information indicating that the communication apparatus 151 is incompatible with Wi-Fi Easy Connect is transmitted, and the Wi-Fi Easy Connect-related information is not transmitted. If the communication apparatus 151 is incompatible with Wi-Fi Easy Connect, neither the Wi-Fi Easy Connect-related information nor the information indicating whether the communication apparatus 151 is compatible with Wi-Fi Easy Connect may be transmitted.

In step S709, the CPU 154 determines whether a request to execute network setup using the network setup protocol is received. Specifically, the CPU 154 determines whether a request for a list of access points is received from the information processing apparatus 101. If the determination is YES in step S709 (YES in step S709), the processing proceeds to step S710. If the determination is NO in step S709 (NO in step S709), the processing proceeds to step S712.

In step S710, the CPU 154 executes network setup using the network setup protocol. Specifically, the CPU 154 executes the operation of processing described as the processing executed by the communication apparatus 151 in the process described in FIG. 6, and this flowchart ends. In step S604 in FIG. 6, the CPU 154 ends (disables) the operation in the network setup mode and disables the setup access point.

In step S711, the CPU 154 ends the DPP standby mode, and this flowchart ends. Either of the operation in the network setup mode and the operation in the DPP standby mode may be ended first so long as it is after the network setup is executed. That is, the CPU 154 may end the operation in the DPP standby mode and then end the operation in the network setup mode. Alternatively, the operation in the network setup mode and the operation in the DPP standby mode may be ended simultaneously.

In step S712, which is executed if the determination is NO in step S709, the CPU 154 determines whether a request to execute network setup using DPP (Wi-Fi Easy Connect) is received. Specifically, the CPU 154 determines whether a request to execute network setup (request to execute Wi-Fi Easy Connect) using DPP is received from the information processing apparatus 101 in the DPP authentication process. If the determination is YES in step S712 (YES in step S712), the processing proceeds to step S713. If the determination is NO in step S712 (NO in step S712), the processing proceeds to step S721. The CPU 154 may start a timeout timer for waiting for a request for network setup using DPP. In this case, if the count value of the timeout timer for waiting for a request to execute Wi-Fi Easy Connect exceeds a threshold, a channel used in DPP communication may be changed. Further, if a request to execute Wi-Fi Easy Connect is not received even when the channel used in DPP communication is changed a predetermined number of times or more, the processing may proceed to step S718. In step S718, the CPU 154 may end the DPP standby mode and wait for a request to execute the network setup mode.

In step S713, the CPU 154 executes network setup using DPP. Specifically, the CPU 154 executes processing described as the processing executed by the communication apparatus 151 in the process described in FIG. 4, and this flowchart ends. The network setup (Wi-Fi Easy Connect) using DPP will be described below with reference to FIG. 10.

In step S714, the CPU 154 determines whether the establishment of a connection between an access point with which the information processing apparatus 101 is connected and the communication apparatus 151 using executed Wi-Fi Easy Connect is successful. If a connection between the communication apparatus 151 and the information processing apparatus 101 is successful, i.e., if the communication apparatus 151 connects to the access point with which the information processing apparatus 101 is connected, it is determined that the establishment is successful. If determinations are NO in FIG. 10 in step S713 and the communication apparatus 151 does not connect to the access point with which the information processing apparatus 101 is connected, it is determined that the establishment fails. Further, even when the communication apparatus 151 connects to the access point in step S1308, if the access point to which the communication apparatus 151 connects is another access point other than the access point with which the information processing apparatus 101 is connected, it is determined that the establishment fails. If the communication apparatus 151 is connected to an access point, even when the access point is not the access point with which the information processing apparatus 101 is connected, it may be determined that the establishment is successful. If the determination is YES in step S714 (YES in step S714), the processing proceeds to step S715. If the determination is NO in step S714 (NO in step S714), the processing proceeds to step S716. If the determinations are YES in FIG. 10 in step S713, the CPU 154 may determine that Wi-Fi Easy Connect is successful. Then, the CPU 154 may end the DPP standby mode and then connect to the access point. The order of processes does not matter.

In step S715, the CPU 154 ends the operation in the network setup mode and the operation in the DPP standby mode, and this flowchart ends. Either of the operation in the network setup mode and the operation in the DPP standby mode may be ended first, or both operations may be ended simultaneously. Further, the order of the process of ending the operation in the network setup mode or the process of ending the operation in the DPP standby mode and the process of connecting to the access point does not matter.

In step S716, the CPU 154 determines whether the establishment of the connection between the access point and the communication apparatus 151 using executed Wi-Fi Easy Connect fails twice or more. The number of times in the determination is not limited, and it is only necessary to determine whether the establishment fails a predetermined number of times or more. If the determination is YES in step S716 (YES in step S716), the processing proceeds to step S718. If the determination is NO in step S716 (NO in step S716), the processing proceeds to step S717. The CPU 154 may determine whether the establishment of the connection between the access point and the communication apparatus 151 using executed Wi-Fi Easy Connect fails twice or more due to the same cause. That is, in each determination process in FIG. 10, it may be determined whether the determination is NO in the same determination process as the previous determination process. Further, if the determination is NO in step S716, i.e., if the number of times the establishment fails is smaller than the predetermined number of times, then to execute Wi-Fi Easy Connect again, the CPU 154 may reset the timeout timer for the DPP standby mode once and start the timeout timer for the DPP standby mode again.

In step S717, to wait for a request to execute Wi-Fi Easy Connect again, the CPU 154 does not end the DPP standby mode and the network setup mode, and updates a public key and a standby channel included in the Wi-Fi Easy Connect-related information. Information included in the Wi-Fi Easy Connect-related information other than the public key and the standby channel may also be updated. The CPU 154 may update the Wi-Fi Easy Connect-related information only when the cause of the failure is information included in the Wi-Fi Easy Connect-related information. The CPU 154 may update only information regarding the cause of the failure included in the Wi-Fi Easy Connect-related information. There is a case where the information processing apparatus 101 stores the Wi-Fi Easy Connect-related information acquired from the communication apparatus 151 in the previous (first) communication with the communication apparatus 151 in a memory such as the RAM 105 or the external storage device 106. However, to execute Wi-Fi Easy Connect again, the information processing apparatus 101 executes Wi-Fi Easy Connect using the updated Wi-Fi Easy Connect-related information acquired from the communication apparatus 151 in the second communication with the communication apparatus 151. This can reduce the execution of unintended network setup. Further, to establish a connection to the information processing apparatus 101 again, the processing returns to step S705.

In step S718, the CPU 154 continues the network setup mode without ending the network setup mode and ends the DPP standby mode. Then, in step S720, the CPU 154 establishes a connection to the information processing apparatus 101. Then, in step S723, if it is determined that a request to execute network setup using the network setup protocol is received (YES in step S723), the processing proceeds to step S724. Then, in step S724, the CPU 154 executes network setup using the network setup protocol. That is, if the establishment of the connection between the access point and the communication apparatus 151 using executed Wi-Fi Easy Connect fails twice or more, network setup using the network setup protocol is executed. This can establish the connection between the access point and the communication apparatus 151 more certainly. Thus, the CPU 154 does not end the network setup mode. If it is determined in step S712 that a request to execute Wi-Fi Easy Connect is received, the CPU 154 may end the network setup mode. In this form, however, if the establishment of the connection between the access point and the communication apparatus 151 using Wi-Fi Easy Connect executed in step S713 fails, it is necessary to start the network setup mode again.

The processes of steps S719 and S720 are similar to the processes of steps S705 and S706, respectively, and therefore will not be described.

In step S721, the CPU 154 determines whether the value of the time counted by the timeout timer for the DPP standby mode exceeds a threshold and the DPP standby mode times out. If the determination is YES in step S721 (YES in step S721), the processing proceeds to step S722. If the determination is NO in step S721 (NO in step S721), the processing returns to step S709.

In step S722, the CPU 154 ends the DPP standby mode, and the processing proceeds to step S723.

The processes of steps S723 and S724 are similar to those of steps S709 and S710, respectively, and therefore will not be described. If the determination is YES in step S723 (YES in step S723), the processing proceeds to step S724. If the determination is NO in step S723 (NO in step S723), the processing proceeds to step S725.

In step S725, the CPU 154 determines whether the value of the time counted by the timeout timer for the network setup mode exceeds a threshold and the network setup mode times out. If the determination is YES in step S725 (YES in step S725), the processing proceeds to step S726. If the determination is NO in step S725 (NO in step S725), the processing returns to step S723.

In step S726, the CPU 154 ends the operation in the network setup mode and disables the setup access point. This is because, as described above, the setup access point is an access point that does not require a password, and therefore, if the setup access point is enabled for a long time, this increases the possibility that an inappropriate apparatus requests a connection to the setup access point. Alternatively, the setup access point may be an access point that requires a password. In this case, the password used to connect to the setup access point is a fixed password (that cannot be changed by the user) identified in advance by the setting application. Then, this flowchart ends.

After the initial settings are completed, the CPU 154 changes the value of the initial start flag saved in the RAM 153 or a memory from the value indicating the initial start state to a value indicating a non-initial start state. The non-initial start state is equivalent to the state where the initial settings are completed. This completes the initial settings, and if the communication apparatus 151 is turned on by the user from the next time onward, the flowchart in FIG. 7 is not executed.

Next, a description will be given of the setup process in the operation in the setup mode started based on the second condition.

FIG. 8 is a flowchart illustrating the setup process executed by the communication apparatus 151. The flowchart illustrated in FIG. 8 is achieved, for example, by the CPU 154 loading the setting application stored in the ROM 152 or a memory into the RAM 153 and executing the setting application. The flowchart in FIG. 8 is executed based on the satisfaction of the second condition.

In step S800, the communication apparatus 151 determines whether a connection mode is set in the communication apparatus 151 when the setting operation is performed. If the determination is YES in step S800 (YES in step S800), the processing proceeds to step S801. If the determination is NO in step S800 (NO in step S800), the processing proceeds to step S802.

In step S801, the communication apparatus 151 disables the connection mode to which the communication apparatus 151 is set when the setting operation is performed. For example, if the infrastructure connection mode is set in the communication apparatus 151 when the setting operation is performed, and the communication apparatus 151 is wirelessly connected with an access point using Wi-Fi, the communication apparatus 151 disables the infrastructure connection mode and disconnects the connection with the access point. The communication apparatus 151 also acquires information regarding the connection mode to which the communication apparatus 151 is set when the setting operation is performed. Then, the communication apparatus 151 saves the information in the RAM 153 or a memory. This is because the information is information necessary to connect again to the connection mode to which the communication apparatus 151 is set when the setting operation is performed, in step S818. For example, the communication apparatus 151 acquires information regarding the access point with which the communication apparatus 151 is wirelessly connected using Wi-Fi when the setting operation is performed. Then, the communication apparatus 151 saves the information in the RAM 153 or a memory. This information includes information (the SSID and information indicating the encryption method) for connecting to the access point with which the communication apparatus 151 is wirelessly connected using Wi-Fi. If a connection mode is not set when the setting operation is performed, the acquisition of information regarding a connection mode is omitted.

The processes of steps S802 to S825 are similar to those of steps S703 to S726, and therefore will not be described.

In step S826, based on the information acquired in step S801 and regarding the connection mode to which the communication apparatus 151 is set when the setting operation is performed, the communication apparatus 151 connects again to the connection mode set when the setting operation is performed. For example, the communication apparatus 151 connects again to the access point with which the communication apparatus 151 is wirelessly connected using Wi-Fi when the setting operation is performed. Also if the DPP standby mode or the network setup mode is ended in step S810 or S814, the communication apparatus 151 connects again to the connection mode set when the setting operation is performed.

The processes of step S704 in FIG. 7 and step S803 in FIG. 8 will be described with reference to FIG. 9.

FIG. 9 is a flowchart illustrating the content of the DPP standby mode start process. The flowchart illustrated in FIG. 9 is achieved, for example, by the CPU 154 loading the setting application stored in the ROM 152 or a memory into the RAM 153 and executing the setting application. The flowchart in FIG. 9 is started, for example, based on the fact that the communication apparatus 151 starts the network setup mode. As described above, since the network setup mode is started based on the satisfaction of the first or second condition, it may be considered that this flowchart is also started, for example, based on the satisfaction of the first or second condition.

In step S1001, the CPU 154 determines a standby channel for DPP communication. The "standby channel for DPP communication" refers to a channel that waits for a request for network setup using DPP transmitted from the information processing apparatus 101. The same channel is also used in the DPP configuration process. Which channel is to be used as the standby channel for DPP communication may be set, for example, via an operation screen of the communication apparatus 151 by the user.

In step S1002, the CPU 154 generates public key information used to securely communicate with the information processing apparatus 101.

In step S1003, the CPU 154 generates the bootstrapping information. The bootstrapping information includes, for example, identification information (the MAC address) regarding the communication apparatus 151, information regarding the standby channel for DPP communication, and the public key information generated in step S1002.

In step S1004, the CPU 154 starts the DPP standby mode. When the DPP standby mode is started, the communication apparatus 151 and the information processing apparatus 101 can communicate with each other based on the DPP authentication.

In step S1005, the CPU 154 starts the timeout timer for the DPP standby mode. If a predetermined time elapses after an operation in the DPP standby mode is started, the CPU 154 stops the operation in the DPP standby mode. This is to transition to the network setup process using the network setup protocol by stopping the operation in the DPP standby mode. Specifically, if the value of the time counted by the timeout timer for the DPP standby mode exceeds the threshold in step S721 or S820 and the DPP standby mode times out, the CPU 154 ends the DPP standby mode.

Then, the processing proceeds to step S705 in FIG. 7 or step S804 in FIG. 8.

The processes of step S713 in FIG. 7 and step S812 in FIG. 8 will be described with reference to FIG. 10.

FIG. 10 is a flowchart illustrating the process of executing network setup using DPP (Wi-Fi Easy Connect) and is equivalent to the operation of the communication apparatus 151 in the sequence in FIG. 4. The flowchart illustrated in FIG. 10 is achieved, for example, by the CPU 154 loading the setting application stored in the ROM 152 or a memory into the RAM 153 and executing the setting application. The flowchart in FIG. 10 is started based on the fact that the communication apparatus 151 receives a request to execute Wi-Fi Easy Connect from the information processing apparatus 101 in the DPP authentication process.

In step S1301, the CPU 154 executes the DPP authentication process. As described above, in the DPP authentication process, the information processing apparatus 101 and the communication apparatus 151 communicate authentication information and information used to encrypt information, thereby authenticating communication between the apparatuses. In the DPP authentication, the communication is executed using DPP.

In step S1302, the CPU 154 determines whether the DPP authentication process with the information processing apparatus 101 is successful. As described above, various pieces of information transmitted from the information processing apparatus 101 in the communication in the DPP authentication are encrypted by the information processing apparatus 101 based on the Wi-Fi Easy Connect-related information acquired in the processing illustrated in FIG. 2. If the CPU 154 succeeds in decrypting the information received from the information processing apparatus 101 using the decryption key held in advance, the CPU 154 authenticates the communication with the information processing apparatus 101. If the information processing apparatus 101 has not acquired correct Wi-Fi Easy Connect-related information and correctly encrypted information, the decryption by the communication apparatus 151 fails. Thus, the authentication fails. Thus, if the authentication of the communication with the information processing apparatus 101 is successful, the CPU 154 determines that the DPP authentication process is successful. If the authentication fails, the CPU 154 determines that the DPP authentication process fails. If the determination is NO in step S1302 (NO in step S1302), this flowchart ends. If, on the other hand, the determination is YES in step S1302 (YES in step S1302), the processing proceeds to step S1303.

In step S1303, the CPU 154 executes the DPP configuration process. In the DPP configuration process, the CPU 154 receives connection information for connecting to an access point set as a setting target of Wi-Fi Easy Connect from the information processing apparatus 101, using Wi-Fi Easy Connect. The connection information includes the SSID, the password, and information indicating the encryption method regarding the access point set as the setting target of Wi-Fi Easy Connect.

In step S1304, the CPU 154 determines whether the DPP configuration process with the information processing apparatus 101 is successful. Specifically, if the CPU 154 receives the connection information for connecting to the access point set as the setting target of Wi-Fi Easy Connect from the information processing apparatus 101, using Wi-Fi Easy Connect, the CPU 154 determines that the DPP configuration process is successful. If the CPU 154 does not receive the connection information, the CPU 154 determines that the DPP configuration process fails. If the determination is NO in step S1304 (NO in step S1304), this flowchart ends. If, on the other hand, the determination is YES in step S1304 (YES in step S1304), the processing proceeds to step S1305. If the DPP configuration process is successful, the CPU 154 acquires the SSID, the encryption method, and the password of the access point.

In step S1305, the CPU 154 determines whether the SSID is included in the information received from the information processing apparatus 101 and regarding the access point set as the setting target of Wi-Fi Easy Connect. If the determination is NO in step S1305 (NO in step S1305), this flowchart ends. If, on the other hand, the determination is YES in step S1305 (YES in step S1305), the processing proceeds to step S1306.

In step S1306, the CPU 154 determines whether the encryption method is included in the information received from the information processing apparatus 101 and regarding the access point set as the setting target of Wi-Fi Easy Connect. If the determination is NO in step S1306 (NO in step S1306), this flowchart ends. If, on the other hand, the determination is YES in step S1306 (YES in step S1306), the processing proceeds to step S1307.

In step S1307, the CPU 154 determines whether the password is included in the information received from the information processing apparatus 101 and regarding the access point set as the setting target of Wi-Fi Easy Connect. In a case where the CPU 154 connects to the access point using DPP communication, the CPU 154 may determine whether the public key information is included instead of the password. If the determination is NO in step S1307 (NO in step S1307), this flowchart ends. If, on the other hand, the determination is YES in step S1307 (YES in step S1307), the processing proceeds to step S715 in FIG. 7 or step S814 in FIG. 8. Then, the CPU 154 ends the DPP standby mode. If the CPU 154 ends the DPP standby mode, the CPU 154 cannot respond to a request for the DPP authentication process from the information processing apparatus 101.

In step S1308, based on the various pieces of information (the SSID, the password, and the encryption method) received from the information processing apparatus 101 and regarding the access point set as the setting target of Wi-Fi Easy Connect, the CPU 154 connects to the access point. Then, this flowchart ends.

As described above, in the present exemplary embodiment, if the execution of Wi-Fi Easy Connect fails, the communication apparatus 151 does not end the network setup mode and the DPP standby mode. Consequently, in response to a request to execute network setup or a request to execute Wi-Fi Easy Connect from the information processing apparatus 101, it is possible to execute network setup again.

In the present exemplary embodiment, if the communication apparatus 151 receives either one of a request to execute network setup and a request to execute Wi-Fi Easy Connect, the communication apparatus 151 also enables the mode regarding the other execution request. That is, the communication apparatus 151 enables the DPP standby mode even when the communication apparatus 151 receives a request to execute network setup. If, however, the communication apparatus 151 receives either one of a request to execute network setup and a request to execute Wi-Fi Easy Connect, the communication apparatus 151 may disable the mode regarding the other execution request. For example, if the communication apparatus 151 receives a request to execute Wi-Fi Easy Connect, the communication apparatus 151 may end the network setup mode. If, however, the execution of Wi-Fi Easy Connect fails, then based on the failure of the execution of Wi-Fi Easy Connect, the communication apparatus 151 starts the network setup mode again. Consequently, in response to a request to execute network setup or a request to execute Wi-Fi Easy Connect from the information processing apparatus 101, it is possible to execute network setup again. Further, if the communication apparatus 151 receives either one of a request to execute network setup and a request to execute Wi-Fi Easy Connect, the communication apparatus 151 disables the mode regarding the other execution request, whereby it is possible to reduce the execution of unintended network setup. In the present exemplary embodiment, after the communication apparatus 151 starts the network setup mode, the DPP standby mode is started. Consequently, at the timing when the information processing apparatus 101 is to execute Wi-Fi Easy Connect, the information processing apparatus 101 can automatically acquire the various pieces of information related to Wi-Fi Easy Connect regarding the communication apparatus 151. Further, the timing when the network setup mode is started is the timing when the user desires to execute network setup of the communication apparatus 151. Thus, the network setup mode and the DPP standby mode are started at equal timings, whereby the user can execute network setup of the communication apparatus 151 in either mode desired by the user. This can improve the convenience of the network setup function. Alternatively, a form may be employed in which the information processing apparatus 101 requests the communication apparatus 151 to start the DPP standby mode, whereby the communication apparatus 151 starts the DPP standby mode. Consequently, it is possible to execute Wi-Fi Easy Connect at the timing when the information processing apparatus 101 is to execute Wi-Fi Easy Connect. Further, the DPP standby mode is started only at the timing when the information processing apparatus 101 is to execute Wi-Fi Easy Connect, whereby it is possible to reduce the execution of network setup unintended by the user.

In the present exemplary embodiment, if the first or second condition is satisfied, then after the network setup mode is started, the DPP standby mode is started. The present invention, however, is not limited to this form. For example, if the first or second condition is satisfied, then after the DPP standby mode is started, the network setup mode may be started. That is, if the conditions for starting the network setup mode and the DPP standby mode are the same, the starting order may not matter, and both modes may be started simultaneously. Further, under the condition that either one of the network setup mode and the DPP standby mode is started, the other mode may be started. For example, through the Wi-Fi connection with the communication apparatus 151, the information processing apparatus 101 requests only information regarding whether the communication apparatus 151 is compatible with Wi-Fi Easy Connect from the communication apparatus 151 among the various pieces of information related to Wi-Fi Easy Connect regarding the communication apparatus 151. Then, if the communication apparatus 151 is compatible with Wi-Fi Easy Connect, the information processing apparatus 101 may request the communication apparatus 151 to start the DPP standby mode. Then, based on the fact that the communication apparatus 151 receives the request, the information processing apparatus 101 may start the DPP standby mode. Further, the information processing apparatus 101 may, after requesting the communication apparatus 151 to start the DPP standby mode, request the Wi-Fi Easy Connect-related information.

Additionally, in the present exemplary embodiment, if the communication apparatus 151 can connect to a predetermined access point as a setting target, the information processing apparatus 101 is controlled to transmit connection information regarding the predetermined access point to the communication apparatus 151 using Wi-Fi Easy Connect. If the communication apparatus 151 cannot connect to the predetermined access point as the setting target, the information processing apparatus 101 is controlled to transmit connection information regarding an access point different from the predetermined access point to the communication apparatus 151 using network setup. The case where the communication apparatus 151 can connect to the predetermined access point is, for example, a case where the communication apparatus 151 is compatible with an encryption method used to connect to the predetermined access point, or a case where the communication apparatus 151 is compatible with a frequency band used to connect to the predetermined access point. Then, the case where the communication apparatus 151 cannot connect to the predetermined access point is, for example, a case where the communication apparatus 151 is incompatible with the encryption method used to connect to the predetermined access point, or a case where the communication apparatus 151 is incompatible with the frequency band used to connect to the predetermined access point. In the present exemplary embodiment, even when the communication apparatus 151 can connect to the predetermined access point, if Wi-Fi Easy Connect is incompatible with the encryption method used to connect to the predetermined access point, the information processing apparatus 101 is controlled to transmit the connection information regarding the access point different from the predetermined access point to the communication apparatus 151 using network setup.

With such a form, if the connection between the predetermined access point and the communication apparatus 151 can be established using Wi-Fi Easy Connect, setup is performed using Wi-Fi Easy Connect, whereby it is possible to achieve simple setup by omitting the input of the password from the user. If the connection between the predetermined access point and the communication apparatus 151 cannot be established using Wi-Fi Easy Connect, setup is performed by a function different from Wi-Fi Easy Connect, whereby it is possible to establish the connection between the access point and the communication apparatus 151 more certainly.

Other Exemplary Embodiments

In the above exemplary embodiment, connection information regarding a connected AP is transmitted using Wi-Fi Easy Connect, and various determinations as in steps S211 to S213 are made regarding the connected AP. The present invention, however, is not limited to this form. Connection information regarding an AP different from the connected AP may be transmitted, or determinations may be made regarding the AP different from the connected AP. Specifically, the AP different from the connected AP may be, for example, an access point with which the information processing apparatus 101 is not connected when the setting operation is performed, but to which the information processing apparatus 101 has connected at any timing before the setting operation is performed. Alternatively, the AP different from the connected AP may be an access point selected by the user from a list of access points to which the information processing apparatus 101 has connected. This is because connection information stored in the OS and regarding an access point to which the information processing apparatus 101 has connected at any timing can be transmitted using Wi-Fi Easy Connect.

In the above exemplary embodiment, setup is performed using Wi-Fi Easy Connect, whereby it is possible to achieve simple setup by omitting the input of the password from the user. Setup, however, may be performed by another function other than Wi-Fi Easy Connect. For example, setup may be performed by a function using the Hyper Text Transfer Protocol.

In this case, it is possible to achieve simple setup by omitting the input of the password from the user, similarly to Wi-Fi Easy Connect. Further, in the above exemplary embodiment, setup is performed using the setup communication protocol (e.g., SNMP). Setup, however, may be performed by another function, instead of performing setup using the setup communication protocol. For example, setup may be performed by a function using the Hyper Text Transfer Protocol.

In the above exemplary embodiment, in the network setup in step S224, a description has been given of a form in which the connection information is transmitted via the connection between the information processing apparatus 101 and the communication apparatus 151 using Wi-Fi. The present invention, however, is not limited to this form. For example, in the network setup, the connection information may be transmitted via a connection between the information processing apparatus 101 and the communication apparatus 151 using a communication method other than Wi-Fi, such as Bluetooth Low Energy. In this form, the information processing apparatus 101 can connect to the communication apparatus 151 using Bluetooth Low Energy while maintaining the Wi-Fi connection with the connected AP. That is, the information processing apparatus 101 can transmit, as the connection information regarding the connected AP, the connection information regarding the access point with which the information processing apparatus 101 is currently connected. Also in this form, a communication protocol different from DPP is used.

Further, in the above exemplary embodiment, in step S207, a description has been given of a form in which the various pieces of information are acquired via the Wi-Fi connection between the access point enabled by the communication apparatus 151 operating in the network setup mode and the information processing apparatus 101. The present invention, however, is not limited to this form. The various pieces of information may be acquired by reading a QR code as in step S220, or may be acquired through communication using another communication method such as NFC or Bluetooth Low Energy.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)?), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2021-141379, filed Aug. 31, 2021, and No. 2022-101446, filed Jun. 23, 2022, which are hereby incorporated by reference herein in their entirety.

What is claimed is:

1. A communication apparatus that communicates with an information processing apparatus, the communication apparatus comprising:
    a first control unit configured to execute first control to acquire connection information for the communication apparatus to connect to an access point from the information processing apparatus via communication with the information processing apparatus using a first protocol;
    a second control unit configured to execute second control to, in a case where a connection between the communication apparatus and the access point is established using the connection information acquired by the first control unit, disable a second state where the communication apparatus can communicate with the information processing apparatus using a second protocol different from the first protocol; and
    a third control unit configured to execute third control to, in a case where the connection between the communication apparatus and the access point is not established using the connection information acquired by the first control unit, continue the second state where the communication apparatus can communicate with the information processing apparatus using the second protocol, without disabling the second state.

2. The communication apparatus according to claim 1, further comprising:
    a fourth control unit configured to execute fourth control to acquire the connection information for the communication apparatus to connect to the access point from the information processing apparatus via the communication with the information processing apparatus using the second protocol; and
    a fifth control unit configured to execute fifth control to, in a case where the connection between the communication apparatus and the access point is established using the connection information acquired by the fourth control unit, disable the second state.

3. The communication apparatus according to claim 2, further comprising a sixth control unit configured to execute sixth control to, in a case where the connection between the communication apparatus and the access point is established using the connection information acquired by the fourth control unit, disable a first state where the communication apparatus can communicate with the information processing apparatus using the first protocol.

4. The communication apparatus according to claim 1, further comprising a seventh control unit configured to execute seventh control to, in a case where the connection between the communication apparatus and the access point is established using the connection information acquired by the first control unit, disable a first state where the communication apparatus can communicate with the information processing apparatus using the first protocol.

5. The communication apparatus according to claim 1, further comprising:
    an update unit configured to, in a case where the connection between the communication apparatus and the access point is not established using the connection information acquired by the first control unit, update channel information included in information used in the communication with the information processing apparatus using the first protocol; and
    an execution unit configured to execute a connection between the communication apparatus and the access point using the connection information again.

6. The communication apparatus according to claim 1, further comprising an eighth control unit configured to execute eighth control to, in a case where the connection between the communication apparatus and the access point is not established using the connection information a predetermined number of times or more, disable a first state where the communication apparatus can communicate with the information processing apparatus using the first protocol.

7. The communication apparatus according to claim 1, wherein in a case where a predetermined time before ending a first state where the communication apparatus can communicate with the information processing apparatus using the first protocol elapses, the first state is disabled.

8. The communication apparatus according to claim 1, wherein in a case where a predetermined time before ending the second state elapses, the second state is disabled.

9. The communication apparatus according to claim 1, further comprising a printing unit configured to execute printing based on a print job received from the information processing apparatus via the access point to which the communication apparatus connects.

10. The communication apparatus according to claim 1, wherein the connection information is information including at least one of pieces of information regarding a service set identifier (SSID), an encryption method, a password, and public key information regarding the access point.

11. The communication apparatus according to claim 1, wherein the first protocol is Device Provisioning Protocol.

12. The communication apparatus according to claim 1, wherein the first protocol is the Hyper Text Transfer Protocol.

13. The communication apparatus according to claim 1, wherein the second protocol is Simple Network Management Protocol.

14. The communication apparatus according to claim 1, wherein the second protocol is the Hyper Text Transfer Protocol.

15. The communication apparatus according to claim 1, wherein the communication with the information processing apparatus using the first protocol and the communication with the information processing apparatus using the second protocol are communication based on the Institute of Electrical and Electronics Engineers (IEEE) 802.11.

16. The communication apparatus according to claim 1,
wherein a first interface used in a first state where the communication apparatus can communicate with the information processing apparatus using the first protocol and a second interface used in the second state are different interfaces,
wherein a single wireless chip is mounted on the communication apparatus,
wherein an operation in the first interface and an operation in the second interface are achieved by the single wireless chip, and
wherein in a case where the communication apparatus operates in both the first and second states, the single wireless chip switches in a time division manner a state where the single wireless chip communicates in the first interface and a state where the single wireless chip communicates in the second interface.

17. The communication apparatus according to claim 1,
wherein a first interface used in a first state where the communication apparatus can communicate with the information processing apparatus using the first protocol and a second interface used in the second state are different interfaces,
wherein a plurality of wireless chips is mounted on the communication apparatus,
wherein an operation in the first interface is achieved by a first wireless chip among the plurality of wireless chips, and an operation in the second interface is achieved by a second wireless chip different from the first wireless chip among the plurality of wireless chips, and
wherein a state where the first wireless chip communicates in the first interface and a state where the second wireless chip communicates in the second interface operate in parallel.

18. A non-transitory computer-readable storage medium that stores a program for causing a computer to function as the units of the communication apparatus according to claim 1.

19. A control method for controlling a communication apparatus that communicates with an information processing apparatus, the control method comprising:
executing first control to acquire connection information for the communication apparatus to connect to an access point from the information processing apparatus via communication with the information processing apparatus using a first protocol;
executing second control to, in a case where a connection between the communication apparatus and the access point is established using the acquired connection information, disable a second state where the communication apparatus can communicate with the information processing apparatus using a second protocol different from the first protocol; and
executing third control to, in a case where the connection between the communication apparatus and the access point is not established using the acquired connection information, continue the second state where the communication apparatus can communicate with the information processing apparatus using the second protocol, without disabling the second state.

* * * * *